US008972731B2

(12) United States Patent
Brown et al.

(10) Patent No.: US 8,972,731 B2
(45) Date of Patent: *Mar. 3, 2015

(54) SYSTEMS, DEVICES, AND METHODS FOR SECURELY TRANSMITTING A SECURITY PARAMETER TO A COMPUTING DEVICE

(75) Inventors: Michael S. Brown, Kitchener (CA); Herbert A. Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,769

(22) Filed: Jun. 8, 2012

(65) Prior Publication Data

US 2012/0246706 A1 Sep. 27, 2012

Related U.S. Application Data

(63) Continuation of application No. 12/420,421, filed on Apr. 8, 2009, now Pat. No. 8,214,645.

(51) Int. Cl.
*H04L 9/08* (2006.01)
*H04L 29/06* (2006.01)
(Continued)

(52) U.S. Cl.
CPC ............ *H04L 63/061* (2013.01); *H04L 9/0816* (2013.01); *H04L 63/123* (2013.01);
(Continued)

(58) Field of Classification Search
USPC ........................................................ 713/171
See application file for complete search history.

(56) References Cited

U.S. PATENT DOCUMENTS 4,621,334 A 11/1986 Garcia
4,805,222 A 2/1989 Young et al.
(Continued)

FOREIGN PATENT DOCUMENTS

CA 2695861 10/2010
CA 2695891 10/2010
(Continued)

OTHER PUBLICATIONS

Canadian Office Action for Canadian Patent Application No. 2,695,891, dated Aug. 14, 2012.
(Continued)

*Primary Examiner* — Kaveh Abrishamkar
*Assistant Examiner* — Ngoc D Nguyen
(74) *Attorney, Agent, or Firm* — Bereskin & Parr LLP/S.E.N.C.R.L., s.r.l.

(57) ABSTRACT

Embodiments of the systems, devices, and methods described herein generally facilitate the secure transmittal of security parameters. In accordance with at least one embodiment, a representation of first data comprising a password is generated at the first computing device as an image or audio signal. The image or audio signal is transmitted from the first computing device to the second computing device. The password is determined from the image or audio signal at the second computing device. A key exchange is performed between the first computing device and the second computing device wherein a key is derived at each of the first and second computing devices. In at least one embodiment, one or more security parameters (e.g. one or more public keys) are exchanged between the first and second computing devices, and techniques for securing the exchange of security parameters or authenticating exchanged security parameters are generally disclosed herein.

20 Claims, 13 Drawing Sheets

(51) Int. Cl.
*H04W 12/04* (2009.01)
*H04L 9/32* (2006.01)
*H04W 12/10* (2009.01)

(52) U.S. Cl.
CPC ............ *H04W 12/04* (2013.01); *H04W 12/10* (2013.01); *H04L 9/0844* (2013.01); *H04L 9/3226* (2013.01); *H04L 2209/80* (2013.01)
USPC ........................................................ 713/171

(56) References Cited

U.S. PATENT DOCUMENTS

| | | | |
|---|---|---|---|
| 5,481,611 | A | 1/1996 | Owens et al. |
| 5,559,961 | A | 9/1996 | Blonder |
| 5,946,377 | A | 8/1999 | Wolf |
| 6,226,383 | B1 * | 5/2001 | Jablon ............................. 380/30 |
| 6,405,922 | B1 | 6/2002 | Kroll |
| 6,442,692 | B1 | 8/2002 | Zilberman |
| 7,230,945 | B2 | 6/2007 | Yeom |
| 7,243,239 | B2 | 7/2007 | Kirovski et al. |
| 7,886,345 | B2 | 2/2011 | Kaliski et al. |
| 8,171,292 | B2 | 5/2012 | Brown et al. |
| 8,214,645 | B2 | 7/2012 | Brown et al. |
| 8,464,062 | B2 | 6/2013 | Brown et al. |
| 2003/0136837 | A1 | 7/2003 | Amon et al. |
| 2004/0230843 | A1 | 11/2004 | Jansen |
| 2005/0183138 | A1 | 8/2005 | Phillips et al. |
| 2005/0273609 | A1 * | 12/2005 | Eronen .......................... 713/171 |
| 2007/0186105 | A1 | 8/2007 | Bailey et al. |
| 2007/0194123 | A1 | 8/2007 | Frantz et al. |
| 2007/0198837 | A1 | 8/2007 | Koodli et al. |
| 2007/0279227 | A1 | 12/2007 | Juels |
| 2009/0240578 | A1 | 9/2009 | Lee et al. |
| 2009/0300732 | A1 | 12/2009 | Hwang et al. |
| 2010/0030642 | A1 | 2/2010 | Huffman et al. |
| 2010/0074443 | A1 | 3/2010 | Ishii et al. |
| 2010/0208888 | A1 | 8/2010 | Weber |
| 2010/0262828 | A1 | 10/2010 | Brown et al. |
| 2012/0198236 | A1 | 8/2012 | Brown et al. |
| 2013/0246794 | A1 | 9/2013 | Brown et al. |
| 2013/0337747 | A1 | 12/2013 | Lee et al. |

FOREIGN PATENT DOCUMENTS

| | | |
|---|---|---|
| EP | 1469372 | 10/2004 |
| EP | 1650894 | 4/2006 |
| EP | 2239919 | 10/2010 |
| EP | 2239918 | 8/2011 |

OTHER PUBLICATIONS

Canadian Office Action for Canadian Patent Application No. 2,695,861, dated Sep. 5, 2012.
Notice of Abandonment. Canadian Patent Application No. 2,695,891. Dated: Apr. 11, 2013.
Terminal Disclaimer. Co-pending U.S. Appl. No. 13/434,265. Dated: Feb. 4, 2013.
Interview Summary. Co-pending U.S. Appl. No. 13/434,265. Dated: Feb. 7, 2013.
Notice of Allowance. Co-pending U.S. Appl. No. 13/434,265. Dated: Feb. 15, 2013.
Office Action. Canadian Patent Application No. 2,695,861. Dated: Feb. 1, 2013.
Co-pending U.S. Appl. No. 13/888,591, "Systems, Devices, and Methods for Securely Transmitting a Security Parameter to a Computing Device", Filed May 7, 2013.
Summons to Attend Oral Proceedings Pursuant to Rule 115(1) EPC. Application No. 09157671.0. Dated: Apr. 23, 2010.
Notice of Allowance. Co-pending U.S. Appl. No. 12/420,387. Dated: Dec. 29, 2011.
Co-pending U.S. Appl. No. 12/420,387. "Systems, Devices, and Methods for Securely Transmitting a Security Parameter to a Computing Device", filed Apr. 8, 2009.
Co-pending U.S. Appl. No. 13/434,265. "Systems, Devices, and Methods for Securely Transmitting a Security Parameter to a Computing Device", filed Mar. 29, 2012.
Prosecution Documents for U.S. Appl. No. 12/420,421.
Prosecution Documents for U.S. Appl. No. 12/420,387.
Information Disclosure Statements and Notices of References Cited for U.S. Appl. No. 12/420,387.
Prosecution Documents for U.S. Appl. No. 13/434,265.
Information Disclosure Statements and Notices of References Cited for U.S. Appl. No. 13/434,265.
Information Disclosure Statements and Notices of References Cited for U.S. Appl. No. 13/888,591.
Canadian Notice of Allowance for Canadian Patent Application No. 2,695,861, dated Aug. 26, 2013.
Information Disclosure Statements and Notices of References Cited for U.S. Appl. No. 12/420,421.
Response to Office Action for Canadian Patent Application No. 2,695,861, dated Jul. 16, 2013.
Response to Office Action for Canadian Patent Application No. 2,695,861, dated Dec. 5, 2012.
Notice of Allowance for Canadian Patent Application No. 2,695,861, dated Aug. 26, 2013.
Office Action. U.S. Appl. No. 13/888,591. Dated: Oct. 3, 2014.
Amendment. U.S. Appl. No. 13/888,591. Dated: Jan. 5, 2015.
Terminal Disclaimer. U.S. Appl. No. 13/888,591. Dated: Jan. 6, 2015.

* cited by examiner

SYSTEMS, DEVICES, AND METHODS FOR SECURELY TRANSMITTING A SECURITY PARAMETER TO A COMPUTING DEVICE

CROSS-REFERENCE TO RELATED APPLICATION

This application is a continuation of U.S. patent application Ser. No. 12/420,421, filed Apr. 8, 2009, now issued as U.S. Pat. No. 8,214,645. The entire contents of U.S. application Ser. No. 12/420,421 are hereby incorporated by reference.

FIELD

Embodiments described herein relate generally to the transmittal of security parameters, and more specifically to the secure transmittal of security parameters between two computing devices.

BACKGROUND

Situations where users of computing devices wish to communicate data present a number of challenges.

Some methods for securely transmitting security parameters (e.g. public keys) between two computing devices may require either manual verification of the security parameter by users of the computing devices (e.g. checking and confirming the public key fingerprint) or a large amount of infrastructure (e.g. a public key infrastructure to create and maintain authentic certificates containing public keys).

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
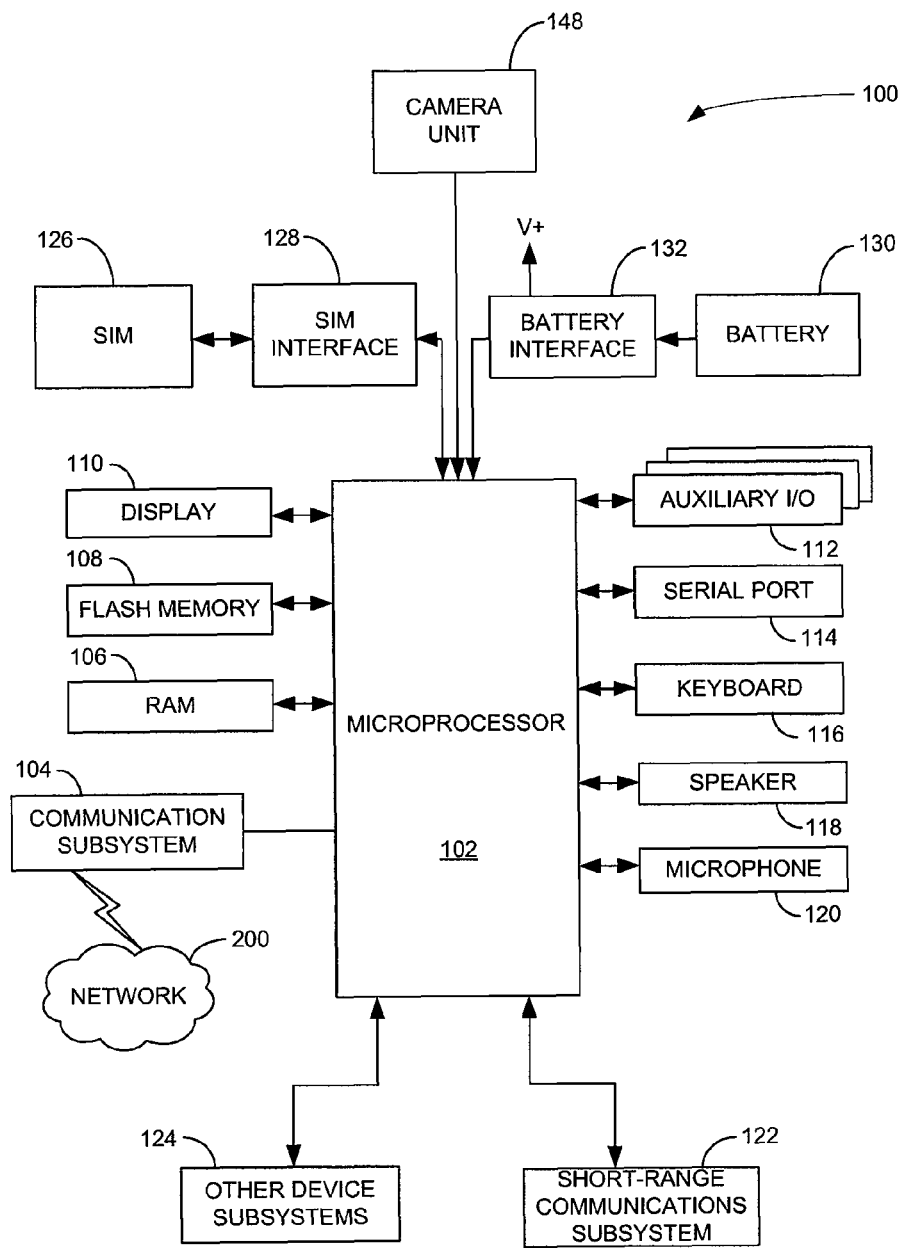
FIG. 1 is a block diagram of a mobile device in one example implementation.
Figure 2:
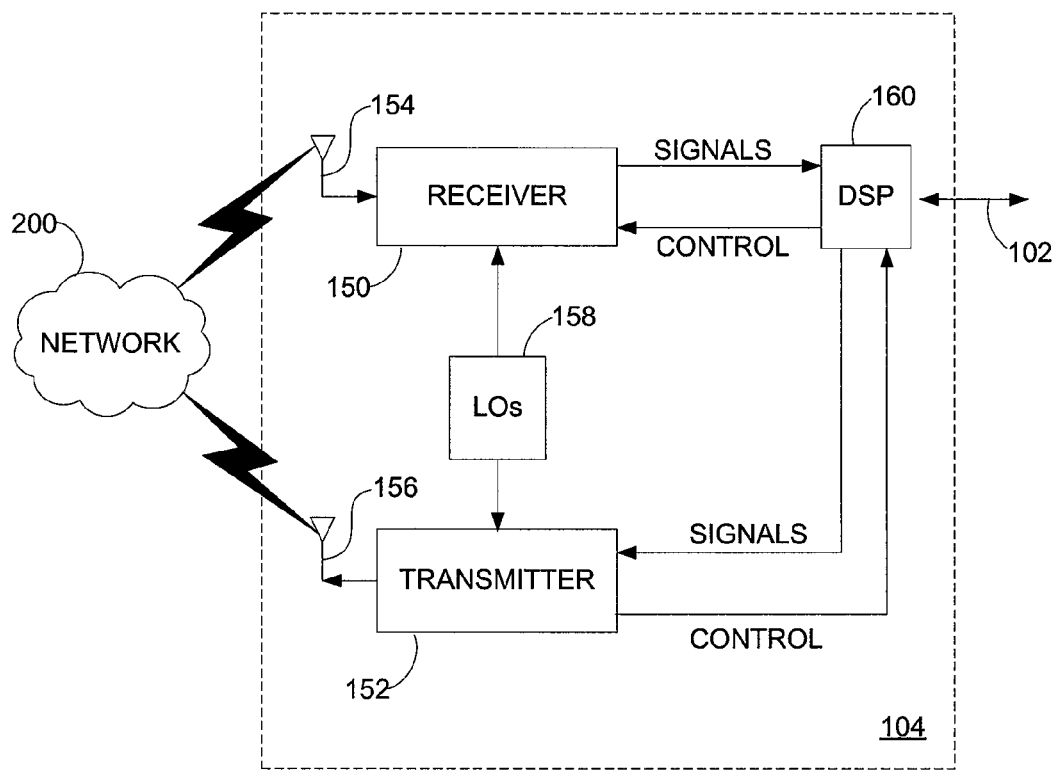
FIG. 2 is a block diagram of a communication subsystem component of the mobile device of FIG. 1.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/ GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. a USIM for UMTS, or a CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including datebook (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Figure 3A:
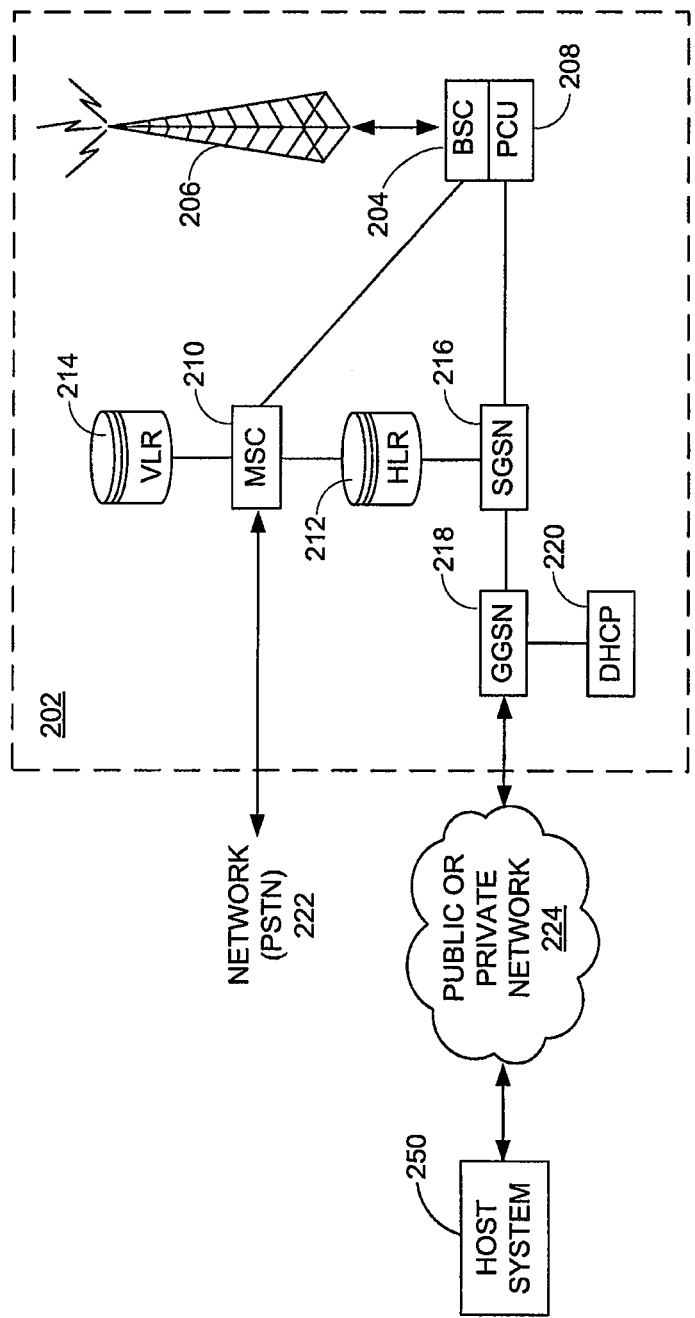
FIG. 3A is a block diagram of a node of a wireless network.

Referring now to FIG. 3A, a block diagram of a node of a wireless network is shown as 202. In practice, network 200 comprises one or more nodes 202. Mobile device 100 communicates with a node 202 within wireless network 200. In the example implementation of FIG. 3A, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server, for example. Once the GPRS Attach is complete, a logical connection is established from a mobile device 100, through PCU 208, and SGSN 216 to an Access Point Node (APN) within GGSN 218, for example. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Mobile device 100 may communicate with a host system 250 through a node 202 of wireless network 200 and a shared network infrastructure 224 such as a service provider network or the public Internet. Access to the host system may also be provided through one or more routers (e.g. situated between the shared network infrastructure 224 and node 202), such as a wireless router illustrated in FIG. 3B.

Figure 3B:
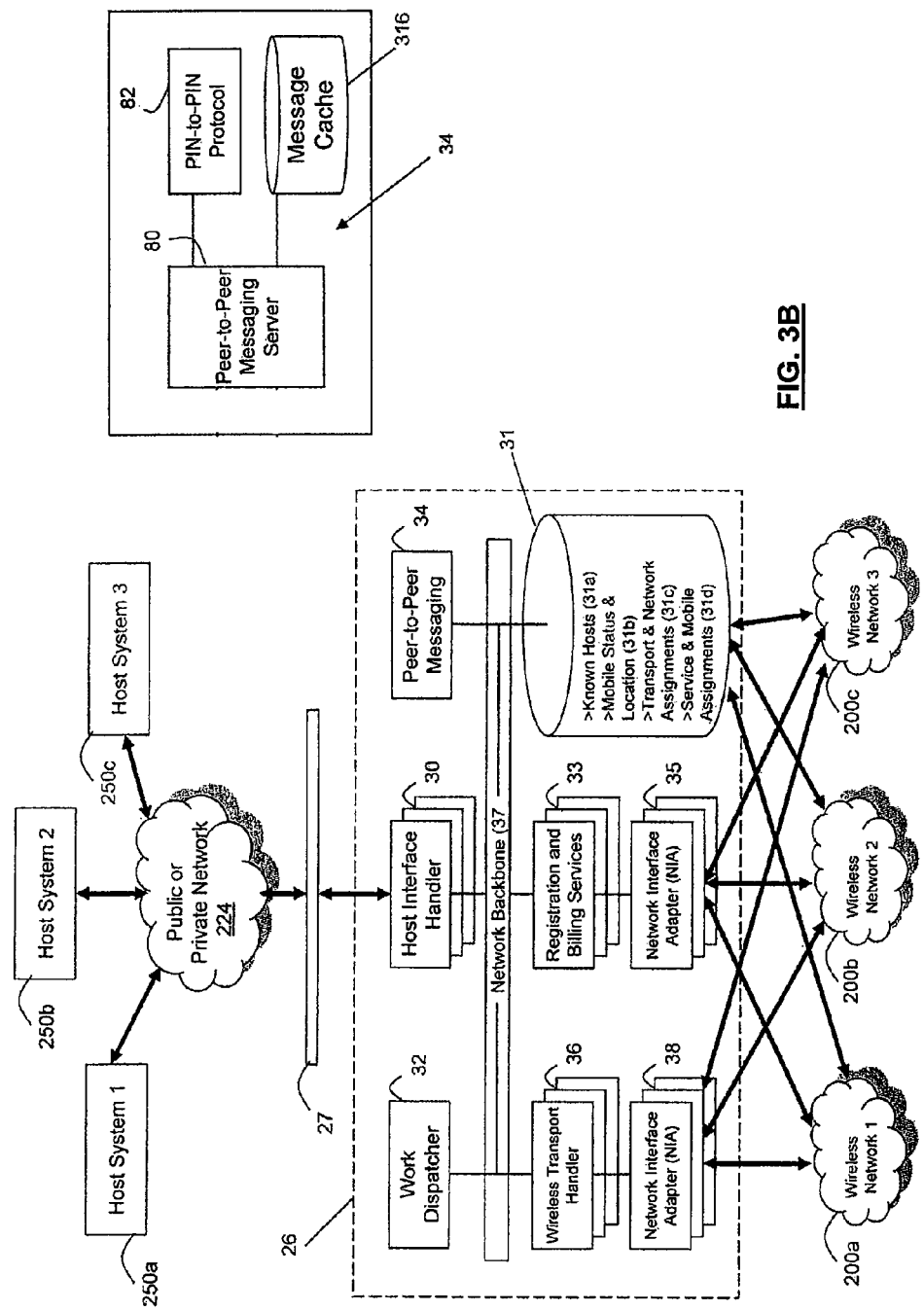
FIG. 3B is a block diagram illustrating components of an example of a wireless router.

Referring to FIG. 3B, a number of components of an example of a wireless router 26 are illustrated. It will be understood that wireless router 26 may comprise different and/or additional components not shown in FIG. 3B.

One component that may be present but not directly part of the wireless router 26 is an Internet firewall 27, which may be off-the-shelf and would protect the wireless router 26 at a lower IP-layer type protocol. Once through the firewall, the host system 250 may connect to one of a plurality of host interface handlers (HIHs) 30. There can be any number of HIHs depending on the number of hosts that are configured and required in the system. The HIH 30 may use various parts of the database 31 to confirm and register the incoming host connection. The known hosts 31a sub-component of the database may provide a way of validating that the host is known and marking its state as 'present' once the host is connected and authorized. Once the host connection is established, a secure and authenticated point-to-point communication connection may be ready for the exchange of data between the host system 250 or service and the wireless router 26. There may be a plurality of such communication connections between the wireless router 26 and a plurality of host systems 250 (e.g. as identified by 250a, 250b, 250c) or services.

Another component, which may work closely with the HIH 30 is called the wireless transport handler (WTH) 36. The WTH 36 takes responsibility for data item transfer to and from the mobile device 100. Depending on the load of traffic, and the number of mobile devices 100 in the system, there may be a plurality of WTH 36 components operating in the system. The network backbone 37, using something like a TIBCO queuing system, combined with the work dispatcher 32, may allow each component of the system to scale as large as needed.

The next component is the network interface adapter (NIA) 38, which could have a communications link directly to the WTH 36, or the NIA 38 could be accessible via the network backbone 37. The NIA 38 may provide a direct interface to the wireless network 200 being supported. Since many of the current wireless data networks 200 may have unique communication connection requirements, this component can buffer the other wireless router components from many of the specific nuances of the particular wireless network it is in communication with. The NIA 38 may be used to isolate the WTH 36 from much of the details of communication links and physical interface requirements of each wireless network 200. There could be any number of wireless networks 200, all with their own connection methods (e.g. shown as 200a, 200b, 200c). In some cases, a proprietary protocol over X.25 may be employed, in the Mobitex or Datatac networks, for example. In other cases, a proprietary protocol over TCP/IP may be employed, like in newer version of the Datatac network, for example. In other cases, an IP connection may be employed, supporting either a TCP or UDP data exchange method, like the CDMA, W-CDMA, and GPRS networks.

To further enhance the wireless router 26 there may be other support components that could either exist separate, or be built into a single component. The first of these may be a work dispatcher 32. One of the functions of the work dispatcher 32, can be to assign a specific WTH 36 to a mobile device 100 so that all data items are routed through the same WTH 36. If a WTH 36 fails, the work dispatcher 32 can find a new WTH 36 to take its place. Additionally, if one WTH 36 becomes too busy or is handling an undesirably large traffic load, the work dispatcher 32 can assign data items that are to be routed to the mobile devices 100 to instead round robin to multiple WTHs 36. This is one example of how the fault tolerant and scalable system is built, and a fault tolerant queuing system like TIBCO may solve this problem very easily. In the other direction, the work dispatcher 36 can find the correct HIH 30 to accept data items from mobile devices 100. Since a host system 250 may connect to any HIH 30, the work dispatcher 36 finds the HIH 30 that has responsibility for or is associated with the host-router communication connection initiated by the correct host system 250, and routes the data appropriately.

Another component in the wireless router 26 that is shown in the example, is the peer-to-peer (P2P) messaging component 34. This component may provide peer-to-peer message routing facility, which can allow mobile devices 100 to send directly to one or more other mobile devices 100, e.g. multicast messages. The P2P component 34 can perform the functions similar to an Instant Messaging gateway, but in this case for mobile devices 100. In some networks, where the mobile's identity might not be static, a mobile device 100 cannot easily send a message to another mobile device 100. In other networks, SMS (short message service) may solve this problem and provides a limited 160 character data exchange. The wireless router 26 may have a store and forward structure that permits it to offer SMS and wireless messaging simultaneously to all wireless devices 100.

The wireless router 26, in this example, hosts a peer-to-peer messaging server 80, which utilizes a PIN-to-PIN protocol 82 and a message cache 316, all of which may be considered components of the peer-to-peer messaging component 34. Personal identification numbers (PINs) may be used to address messages, for example. Such a PIN-based messaging system may be implemented using a server-based communication infrastructure, such as one that provides email, SMS, voice, Internet and other communications. Wireless router 26 may be particularly suitable for hosting a peer-to-peer messaging server 80. In a PIN-based messaging protocol 82, a message may have associated therewith a PIN corresponding to the mobile device 100 which has sent the message (source) and one or more destination PINs identifying each intended recipient (destination(s)). When conducting a PIN-to-PIN message exchange, mobile devices may communicate directly with the wireless router 26 in a client based exchange where, similar to other peer-to-peer programs, an intermediate server is not required. Upon obtaining one or more recipient PINs according to the PIN-to-PIN protocol 82, the wireless router 26 may then route the message to all intended recipients associated with devices having such PINs. The wireless router 26 typically also provides a delivery confirmation to the original sender, which may or may not be displayed to the user, and the mobile device 100 can use an exchange of messages pertaining to in and out of coverage situations to update presence information on the mobile device 100. The destination device can also provide such delivery information. The wireless router 26 may hold messages until they are successfully delivered. Alternatively, if delivery cannot be made after a certain timeout period, the wireless router 26 may provide a response indicating a failed delivery. The wireless router 26 may choose to expire message if a certain waiting period lapses. In such cases, the mobile device 100 may then choose whether or not to resend the message 8.

Registration and billing are two other components 33. These two components could be separated or merged. Registration may involve keeping track of all valid mobile devices 100 and tracking their location when they make major wireless network 200 changes. These changes are propagated to the associated database 31 and used by the work dispatcher 32 for important work assignment decisions. For example, if a mobile device 100 travels to another country it might be necessary to move the responsibility of data item delivery to another WTH 36 component. As part of the registration function, the user of the mobile device 100 may be provided with added security. Services and mobile devices must be registered and authenticated before they can exchange data.

The billing component may keep a running tally of the services and amounts of data exchanged between each host system 250 and each mobile device 100. The billing component receives messages via the network backbone 37. For example, by using a TIBCO architecture it would be possible to broadcast billing messages to a group of billing components 33. Depending on the load of traffic, multiple billing components 33 could be processing and saving the billing information to the database 31. Each record could have lots of information pertinent to generating complex and relevant billing information. For example, it might be possible to save the size of the data exchanged, the time of day, the duration, the type of service access and other key pricing elements.

Figure 4:
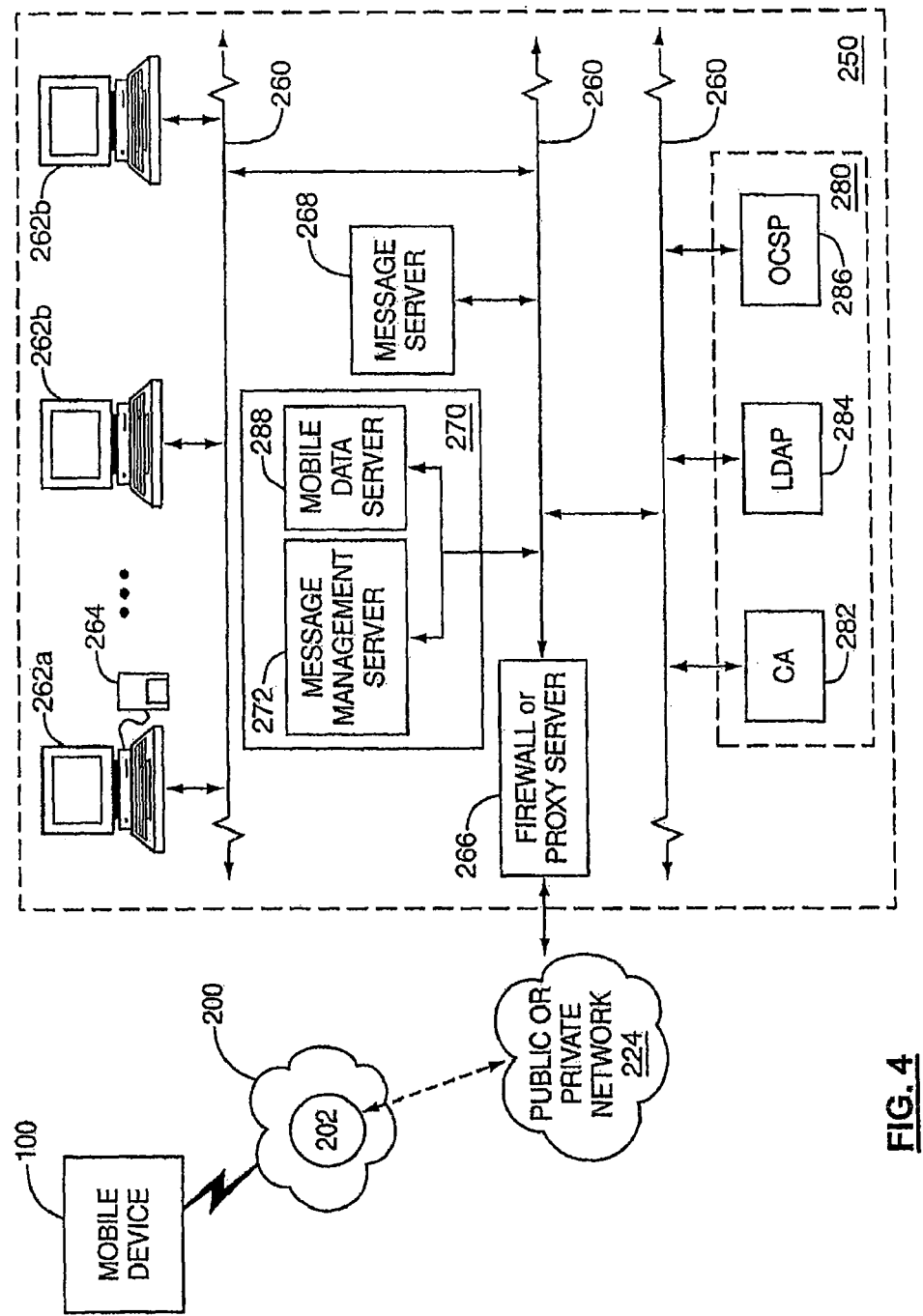
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 may be situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown in FIG. 4], and computing devices of LAN 250 may operate from behind a firewall or proxy server 266.

In a variant implementation, LAN 250 comprises a wireless VPN router [not shown in FIG. 4] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be configured to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 may be automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 may comprise a message management server 272, for example. Message management server 272 may be used to specifically provide support for the management of messages, such as e-mail messages, that are to be handled by mobile devices. Generally, while messages are still stored on message server 268, message management server 272 may be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be configured to provide other control functions, such as only pushing certain message information or pre-defined portions (e.g. "blocks") of a message stored on message server 268 to mobile device 100. For example, when a message is initially retrieved by mobile device 100 from message server 268, message management server 272 is configured to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices are supported.

While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send message data to a recipient in encrypted form, the recipient's public key is used to encrypt the message data, which can then be decrypted only using the recipient's private key. Alternatively, in some encoding techniques, a one-time session key is generated and used to encrypt the message data, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the encrypted message data. The message header may comprise data specifying the particular encryption scheme that must be used to decrypt the encrypted message data. Other encryption techniques based on public key cryptography may be used in variant implementations. However, in each of these cases, only the recipient's private key may be used to facilitate successful decryption of the encrypted message data, and in this way, the confidentiality of that data can be maintained.

As a further example, a sender may sign message data using a digital signature. A digital signature generally comprises a digest of the message data being signed (e.g. a hash of the message data being signed) encoded using the sender's private key, which can then be appended to the outgoing message. To verify the digital signature when received, the recipient uses the same technique as the sender (e.g. using the same standard hash algorithm) to obtain a digest of the received message data. The recipient also uses the sender's public key to decode the digital signature, in order to obtain what should be a matching digest for the received message data. If the digests of the received message do not match, this suggests that either the message data was changed during transport and/or the message data did not originate from the sender whose public key was used for verification. Digital signature algorithms are designed in such a way that only someone with knowledge of the sender's private key should be able to encode a digital signature that the recipient will decode correctly using the sender's public key. Therefore, by verifying a digital signature in this way, authentication of the sender and message integrity can be maintained.

When reference is made to the application of encoding to message data, this means that the message data is encoded using an encoding technique. As noted above, an act of encoding message data may include either encrypting the message data or signing the message data. As used in this disclosure, "signed and/or encrypted" means signed or encrypted or both.

In S/MIME, the authenticity of public keys used in these operations may be validated using certificates. A certificate is a digital document issued, for example, by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 may be configured to store public keys (e.g. in S/MIME certificates, PGP keys) of other individuals. Keys stored on a user's computer 262a may be downloaded from computer 262a to mobile device 100 through cradle 264, for example.

Mobile device 100 may also be configured to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be configured to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

Situations where users of computing devices wish to communicate data present a number of challenges. A primary concern is the security of the communication, which may often be wireless. Specifically of concern is the authenticity and confidentiality of the data being communicated as an attacker within the transmission range of the wireless communication channel may easily tamper with or monitor the data being communicated. Some methods for securely transmitting security parameters (e.g. public keys) between two computing devices may require either manual verification of the security parameter by users of the computing devices (e.g. checking and confirming the public key fingerprint) or a large amount of infrastructure (e.g. a public key infrastructure to create and maintain authentic certificates containing public keys).

Embodiments of the systems, devices, and methods described herein generally facilitate the secure transmittal of security parameters from one computing device to another computing device.

In one broad aspect, there is provided a system, device, and method of transmitting one or more security parameters from a first computing device to a second computing device, the method performed at the first computing device, the method comprising: generating an image or audio signal for transmission to the second computing device, wherein the image or audio signal is a representation of first data, the first data comprising a password, wherein the password is not derived from the one or more security parameters; transmitting the image or audio signal to the second computing device at which the password is determinable from the image or audio signal; performing a key exchange with the second computing device over a communication channel between the first and second computing devices, wherein second data is exchanged between the first and second computing devices in accordance with a key exchange protocol, such that an encryption key is derived at each of the first and second computing devices using the password; encrypting the one or more security parameters with the encryption key or a session key derived from the encryption key; and transmitting the encrypted one or more security parameters to the second computing device. In some embodiments, the method performed at the first computing device further comprises receiving one or more encrypted second security parameters from the second computing device, and decrypting the one or more encrypted second security parameters using the encryption key or a session key derived from the encryption key.

In another broad aspect, there is provided a system, device, and method of transmitting one or more security parameters from a first computing device to a second computing device, the method performed at the first computing device, the method comprising: generating an image or audio signal for transmission to the second computing device, wherein the image or audio signal is a representation of first data, the first data comprising a password, wherein the password is not derived from the one or more security parameters; transmitting the image or audio signal to the second computing device at which the password is determinable from the image or audio signal; and performing a key exchange with the second computing device over a communication channel between the first and second computing devices, wherein second data is exchanged between the first and second computing devices in accordance with a key exchange protocol, such that a key is derived at each of the first and second computing devices using the password, and wherein the one or more security parameters is transmitted to the second computing device during the key exchange; wherein said performing further comprises computing a confirmation value based on at least the one or more security parameters, and using the key derived at the first computing device, and transmitting the confirmation value to the second computing device, wherein the one or more security parameters are authenticated when the confirmation value is successfully verified at the second computing device. In some embodiments, the confirmation value comprises a keyed-hash message authentication code. In some embodiments, the method performed at the first computing device further comprises receiving one or more second security parameters from the second computing device, receiving a second confirmation value from the second computing device, and verifying the second confirmation value.

In some embodiments, said transmitting the image or audio signal to the second computing device is performed when the first and second computing devices are in close physical proximity.

In some embodiments, the one or more security parameters comprise one or more public keys stored on the first computing device. For example, the one or more public keys may comprise a first public key usable to encrypt messages to a user of the first computing device, and a second public key usable to verify digital signatures of messages digitally signed at the first computing device.

In some embodiments, the key exchange protocol comprises a Simple Password Exponential Key Exchange (SPEKE) protocol.

In some embodiments, the image comprises a barcode. In some embodiments, at the transmitting, the image is transmitted via a display of the first computing device.

In some embodiments, the audio signal comprises a plurality of audio tones. In some embodiments, at the transmitting, the audio signal is transmitted via a speaker of the first computing device. In some embodiments, at the transmitting, the audio signal is transmitted via a channel established during a phone call between the first computing device and the second computing device.

In some embodiments, the first data further comprises routing data associated with the first computing device. In at least one embodiment, the routing data associated with the first computing device comprises a PIN associated with the first computing device, and wherein the communication channel between the first and second computing devices comprises a PIN-to-PIN channel.

In some embodiments, the method performed at the first computing device further comprises generating the password, wherein the password is generated as a random number or string. In at least one embodiment, the password is generated for a single instance of said generating the image or audio signal.

In some embodiments, at least one computing device selected from the following group comprises a mobile device: the first computing device, and the second computing device.

In another broad aspect, there is provided a system, device, and method of transmitting one or more security parameters to a first computing device from a second computing device, the method performed at the second computing device, the method comprising: receiving an image or audio signal, wherein the image or audio signal is a representation of first data, the first data comprising a password, wherein the password is not derived from a security parameter stored on the first computing device; determining the password from the image or audio signal; performing a key exchange with the first computing device over a communication channel between the first and second computing devices, wherein second data is exchanged between the first and second computing devices in accordance with a key exchange protocol, such that an encryption key is derived at each of the first and second computing devices using the password; encrypting the one or more security parameters with the encryption key or a session key derived from the encryption key; and transmitting the encrypted one or more security parameters to the first computing device. In some embodiments, the method performed at the second computing device further comprises receiving one or more encrypted second security parameters from the first computing device, and decrypting the one or more encrypted second security parameters using the encryption key or a session key derived from the encryption key.

In another broad aspect, there is provided a system, device, and method of transmitting one or more security parameters to a first computing device from a second computing device, the method performed at the second computing device, the method comprising: receiving an image or audio signal, wherein the image or audio signal is a representation of first data, the first data comprising a password, wherein the password is not derived from a security parameter stored on the first computing device; determining the password from the image or audio signal; and performing a key exchange with the first computing device over a communication channel between the first and second computing devices, wherein second data is exchanged between the first and second computing devices in accordance with a key exchange protocol, such that a key is derived at each of the first and second computing devices using the password, and wherein the one or more security parameters is transmitted to the first computing device during the key exchange; wherein said performing further comprises computing a confirmation value based on at least the one or more security parameters, and using the key derived at the second computing device, and transmitting the confirmation value to the first computing device, wherein the one or more security parameters are authenticated when the confirmation value is successfully verified at the first computing device. In some embodiments, the confirmation value comprises a keyed-hash message authentication code. In some embodiments, the method performed at the second computing device further comprises receiving one or more second security parameters from the first computing device, receiving a second confirmation value from the first computing device, and verifying the second confirmation value.

In some embodiments, said receiving the image or audio signal is performed when the first and second computing devices are in close physical proximity.

In some embodiments, the one or more security parameters comprise one or more public keys stored on the second computing device. For example, the one or more public keys may comprise a first public key usable to encrypt messages to a user of the second computing device, and a second public key usable to verify digital signatures of messages digitally signed at the second computing device.

In some embodiments, the key exchange protocol comprises a SPEKE protocol.

In some embodiments, the image comprises a barcode. In some embodiments, at the receiving, the image is received via a camera of the second computing device, wherein the camera is configured to process the image after being displayed on a display of the first computing device.

In some embodiments, the audio signal comprises a plurality of audio tones. In some embodiments, at the receiving, the audio signal is received via a microphone of the second computing device, wherein the microphone is configured to receive the audio signal after being output on a speaker of the first computing device. In some embodiments, at the receiving, the audio signal is received via a channel established during a phone call between the first computing device and the second computing device.

In some embodiments, the first data further comprises routing data associated with the first computing device. In some embodiments, the method performed at the second computing device further comprises establishing the communication channel by initiating contact with the first computing device using the routing data. In at least one embodiment, the routing data comprises a PIN associated with the first computing device, and wherein the communication channel between the first and second computing devices comprises a PIN-to-PIN channel.

In some embodiments, the password comprises a random number or string.

In some embodiments, at least one computing device selected from the following group comprises a mobile device: the first computing device, and the second computing device.

These and other aspects and features of various embodiments will be described in greater detail below.

Figure 5:
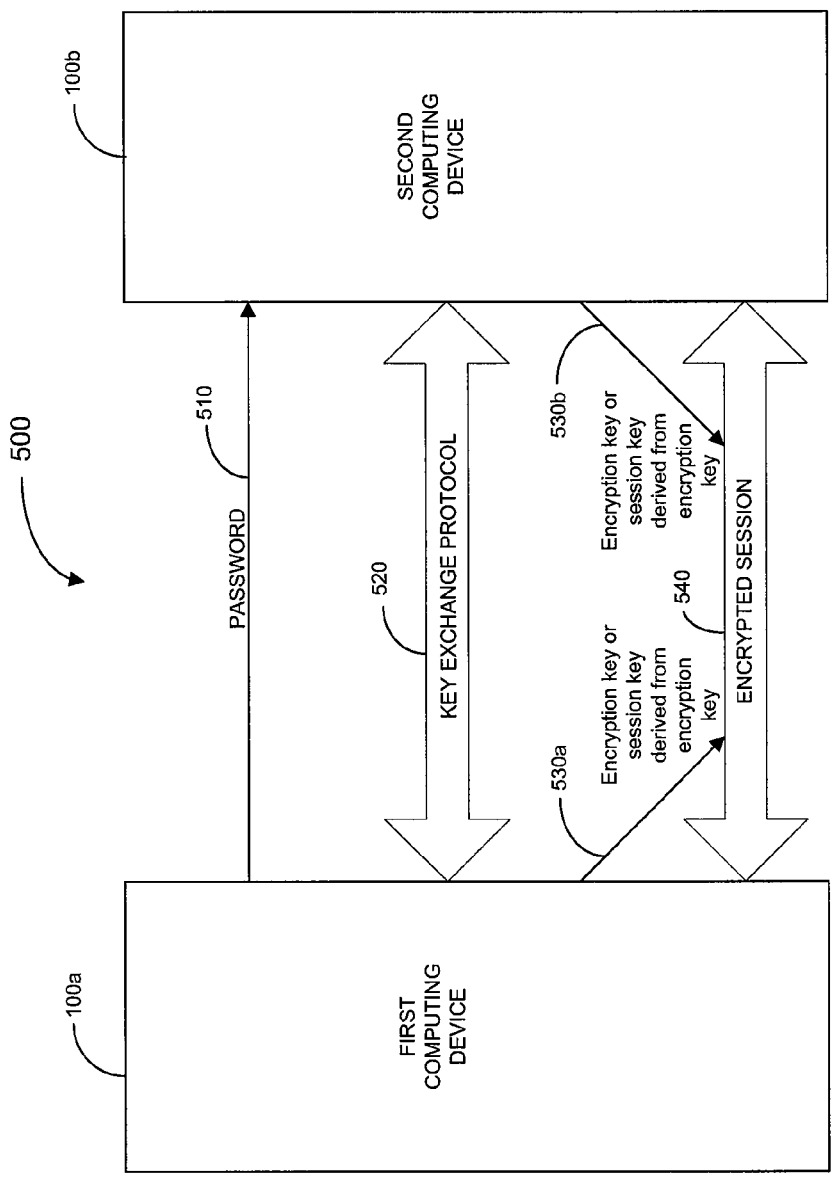
FIG. 5 is a block diagram illustrating the secure transmittal of security parameters from one computing device to another computing device in accordance with at least one embodiment.

Reference is first made to FIG. 5, wherein a block diagram 500 illustrating the secure transmittal of security parameters from one computing device to another computing device is shown, in accordance with at least one embodiment.

A first computing device, such as a mobile device (e.g. mobile device 100 of FIG. 1 represented as mobile device 100a), begins by communicating a password 510 to a second computing device, such as a mobile device (e.g. mobile device 100 of FIG. 1 represented as mobile device 100b). An out-of-band communication path may be used for communicating the password between the two computing devices to provide greater security. Once both computing devices have the password, a key exchange may then be performed between the first computing device and the second computing device over a communication channel between the two computing devices, which may be different from the path used to communicate the password, in accordance with a key exchange protocol 520.

In this embodiment, as part of the key exchange protocol 520, an encryption key is derived at each of the first computing device and the second computing device using password 510. The encryption key or a session key derived from the encryption key 530a, 530b, may then be used to encrypt one or more security parameters (e.g. one or more public keys) or other data to be communicated, thereby establishing an encrypted session 540 over the communication channel between the two computing devices.

The secure transmittal of security parameters from one computing device to another computing device in accordance with at least one embodiment will be described in further detail below.

Figure 6:
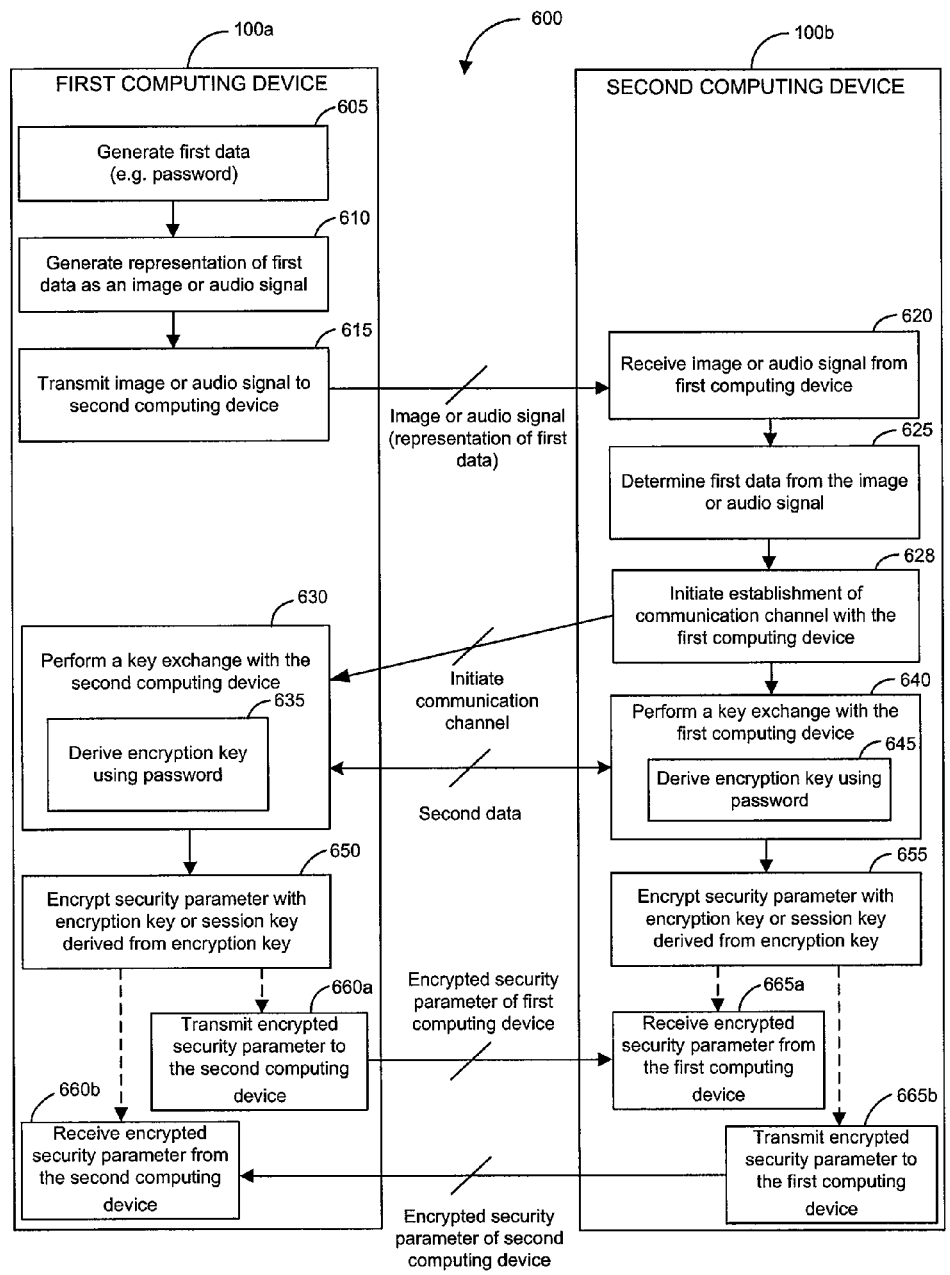
FIG. 6 is a flowchart illustrating acts of a method of securely transmitting a security parameter from one computing device to another computing device in accordance with at least one embodiment.

Referring to FIG. 6, a flowchart illustrating acts of a method 600 of securely transmitting a security parameter from one computing device to another computing device (e.g. as previously described with reference to FIG. 5) is shown, in accordance with at least one embodiment.

In the example embodiments described herein, for illustrative purposes, it is assumed that a first computing device, such as a mobile device (e.g. mobile device 100 of FIG. 1 represented as mobile device 100a), initiates the transmittal of security parameters. However, persons skilled in the art will appreciate that another computing device, such as a different mobile device (e.g. mobile device 100 of FIG. 1 represented as mobile device 100b), may initiate the transmittal of security parameters and, therefore, the acts of method 600 performed at the first computing device may alternatively be performed by a different computing device.

In at least one embodiment, at least some of the acts of method 600 are performed by a processor executing an application (e.g. comprising one or more application modules)

residing on a computing device, such as a mobile device (e.g. mobile device 100 of FIG. 1). In variant embodiments, the application may reside on a computing device other than a mobile device.

At 605, a password is optionally generated at the first computing device. The password may comprise a number, an alphanumeric string (e.g. comprising letters, numbers, and/or symbols), or data in some other suitable format.

The password may be manually generated (e.g. entered as user input in a user interface by a user of the first computing device), or it may be randomly generated (e.g. by a random password generator). In some embodiments, the password may comprise, for example, 32-bits of randomly generated data. The use of randomly generated passwords may provide for added security over the use of manually generated passwords, as randomly generated passwords may typically be more cryptographically complex than manually generated passwords. For example, a random password generator could be configured to generate a random password comprising a combination of lower and upper case letters, numbers and punctuation symbols which would typically have a higher strength (i.e. higher information entropy) than a manually generated password and may be more difficult for an attacker to try and guess than a manually generated password.

The password may be a password generated specifically for this instance (e.g. this may be referred to as a "short-term" or "ephemeral" password) or it may be a password that is also used for some other purpose (e.g. this may be referred to as a "long-term" password). Unlike long-term passwords that may be repeatedly used (e.g. for some other purpose such as user authentication), a short-term password may be generated afresh for each instance in which a computing device is to initiate acts of a method for securely transmitting a security parameter to another computing device, in accordance with an embodiment described herein. As compared with long-term passwords, short-term passwords may prevent an attacker from using the previous communication history of a computing device to reconstruct the password, since the password is generated afresh for each new instance. Furthermore, since short-term passwords are generated afresh for each new instance, the password will not typically be pre-stored on the computing device (e.g. in a non-volatile memory). This may prevent an attacker from hacking into the computing device to obtain the password.

At 610, an image or audio signal is generated at the first computing device for transmission to the second computing device at 615, wherein the image or audio signal is a representation of first data, the first data comprising a password (e.g. the password generated at 605).

In at least one embodiment, the password is not derived from a security parameter (e.g. a public key) associated with a user of the first computing device (e.g. the password is not one of the security parameters itself or a hash thereof). Put another way, the password and the one or more security parameters are independent of each other. In these embodiments, the present inventors recognized that it may not be desirable to use a password that is derived from a security parameter if enhanced security is desirable.

By not communicating data initially that is related to a security parameter (e.g. a public key) of the first computing device, this might add an additional layer of security and provide other benefits. A potential disadvantage of transmitting a security parameter is that an attacker can intercept the communication and obtain the security parameter. A potential disadvantage of transmitting a hash of a security parameter is that an attacker who intercepts the communication and obtains the hash of the security parameter might try all possibilities of the security parameter and compare each guess with the hash in order to reconstruct the security parameter. Moreover, another potential disadvantage of transmitting a security parameter or hash thereof relates to the resultant size of the binary representation of the security parameter or hash thereof that is to be communicated. For example, a binary representation of a 512-bit elliptic curve public key may require about 66 bytes. Persons skilled in the art will appreciate that a password may typically be generated as one that is shorter in length than a security parameter (e.g. a public key) or hash thereof, and therefore, less data would need to be transmitted by the first computing device to the second computing device. Transmission of a short password may also consume less computing resources (e.g. bandwidth, time, processing power, etc.) than transmission of a security parameter or hash thereof, which may be particularly beneficial when, for example, the first computing device (and/or the second computing device) comprises a mobile device.

In at least one embodiment, each of one or more security parameters (e.g. one or more public keys) associated with a user of either the first computing device or the second computing device is not derivable from the password. Persons skilled in the art will appreciate that in order for a security parameter (e.g. a public key) to be derivable from a password, the password would need to be more complex than the security parameter. By having the security parameter not be derivable from the password, this allows for the use of a smaller, perhaps cryptographically weaker, password to bootstrap into a larger cryptographically stronger encryption key.

First data may additionally comprise routing data associated with the first computing device. The routing data may be such data that identifies a computing device, so that it may be contacted by another computing device to establish a communication channel.

In at least some embodiments, the routing data associated with the first computing device may comprise a PIN associated with the first computing device. For example, a PIN is typically a unique personal identification number identifying a particular computing device. The PIN may be assigned at the time of manufacture, for example. In other example embodiments, the routing data may comprise an IP address and port number, or MAC address and subnet mask, or Bluetooth device address, or phone number, or SMS address, for example. The PIN may comprise 8 hexadecimal-ASCII characters, for example.

First data may also optionally comprise additional identifying information of the first computing device or a user thereof. For example, such identifying information may include, but is not limited to, the name of the user of the first computing device, the name of a group of which the user of the first computing device is a member and is seeking to invite the user of the second computing device to join, the type of the group (e.g. "friend", "family", or "work"), a unique identifier for the particular key exchange request (e.g. as initiated at 615), or a timestamp or expiry data (e.g. to indicate when a key exchange must be completed by), or some combination of the above, for example.

In at least one embodiment, the image may comprise a barcode that is a representation of first data (e.g. the password generated at 605), for example. A barcode is a visual representation of information, as known in the art. For example, a barcode may comprise a 1-dimensional barcode represented by a series of lines of varying widths and spacing. As a further example, barcode may comprise a 2-dimensional barcode represented by squares, dots, hexagons or other geometric patterns. In some embodiments, the barcode may be a black and white barcode. In other embodiments, the barcode may be a color barcode.

In at least one embodiment, the audio signal may comprise a plurality of audio tones that is a representation of first data, for example. The plurality of audio tones may comprise a Dual Tone Multiple Frequency (DTMF) sequence, for example.

In some embodiments, the generation of the image or audio signal at 610 may be made based on user input provided via a user interface, in which the user of the first computing device may be presented with a dialog box prompting him or her to generate the image or audio signal.

At 615, the image or audio signal generated at 610 is transmitted to the second computing device. At 620, the image or audio signal (which comprises a representation of first data, the first data comprising, for example, a password and may additionally comprise routing data and/or other identifying information) transmitted from the first computing device at 615 is received at the second computing device.

In one embodiment, the image may be transmitted via a display associated with the first computing device at 615. The display may either reside on the first computing device itself or may be a separate device coupled to the first computing device. The image may be received via a camera or other optical sensing device associated with the second computing device at 620. The camera or other optical sensing device may either reside on the second computing device itself or may be a separate device coupled to the second computing device. In this embodiment, the camera or other optical sensing device is configured to process the image (e.g. photograph the image or scan the image) transmitted from the first computing device, the image being captured after the image is displayed on the display associated with the first computing device.

Persons skilled in the art will appreciate that the image may be transmitted and received using other means in variant embodiments. For example, the image may be transmitted and received as an image file through a wired connection established between the first computing device and the second computing device. As a further example, the image may be transmitted as a printout to a printer, wherein the printer may either reside on the first computing device itself or may be a separate device coupled to the first computing device. The image may then be received by the second computing device through a scanner that scans the image, wherein the scanner may either reside on the second computing device itself or may be a separate device coupled to the second computing device.

The audio signal may be transmitted via a speaker (or e.g. an earpiece) associated with the first computing device at 615, wherein the speaker may either reside on the first computing device itself or may be a separate device coupled to the first computing device. The audio signal may be received via a microphone associated with the second computing device at 620, wherein the microphone may either reside on the second computing device itself or may be a separate device coupled to the second computing device, and the microphone is configured to process the audio signal (e.g. record the audio signal) transmitted from the first computing device (e.g. the audio signal being captured after the audio signal is played on the speaker associated with the first computing device).

Persons skilled in the art will appreciate that the audio signal may be transmitted and received using other means in variant embodiments. For example, the audio signal may be transmitted and received as an audio file through a wired connection established between the first computing device and the second computing device. As a further example, the audio signal may be transmitted through a phone call (e.g. a voice call) over a channel established between the first computing device and the second computing device, although this embodiment may provide less security than that provided by other embodiments described herein depending on whether the channel is secure from eavesdropping.

In some embodiments, the first computing device may be in close physical proximity to the second computing device when the image or audio signal is to be transmitted. By transmitting and receiving the image or audio signal when the first computing device and second computing device are in close physical proximity to each other, and representing first data in a form that requires the two computing devices to be in close physical proximity to one another in order for the first data to be successfully transmitted, an added layer of security may be provided. For instance, the users of both computing devices can better ensure that they are communicating with each other's computing device only, and not the computing device of an attacker.

For example, the user of the first computing device can better ensure that the intended recipient, the user of the second computing device, has received the image or audio signal (e.g. the acts of a method in accordance with an embodiment described herein may be initiated when the user of the first and second computing devices are "face-to-face"), and reduce the risk that the image or audio signal will be unknowingly intercepted. Similarly, the user of the second computing device can ensure that the image or audio signal is received from the intended sender, the user of the first computing device, and not from the computing device of an attacker posing as the user of the first computing device. Accordingly, authenticity and confidentiality of the password can be generally maintained, as the authenticity and confidentiality of the image or audio signal that is a representation of first data comprising the password can be maintained.

Where the password, for example, is represented in an image that is being transmitted and received, the user of the first computing device and the user of the second computing device can ensure that there is no one else (i.e. a possible attacker) within a line of sight of the image as it is transmitted (e.g. via a display associated with the first computing device) and received (e.g. via a camera associated with the second computing device).

Where the password, for example, is represented in an image that is being transmitted and received, two computing devices may be in close physical proximity when, for example, they are at a sufficient distance such that when the image is transmitted by one computing device (e.g. via a display), it may be received at the other computing device (e.g. via a camera), and processed by the other computing device to determine the first data without error. For example, a greater distance between the two computing devices may be accommodated where the display associated with the first computing is larger, and/or where the camera associated with the second computing device is capable of capturing images accurately at a greater distance.

As another example, where the password, for example, is represented as an audio signal that is being transmitted and received, the user of the first computing device and the user of the second computing device can ensure that there is no one else (i.e. a possible attacker) that may potentially eavesdrop on the audio signal as it is transmitted (e.g. via a speaker associated with the first computing device) and received (e.g. via a microphone associated with the second computing device).

Where the password, for example, is represented in an audio signal that is transmitted and received, two computing devices may be in close physical proximity when, for example, they are at a sufficient distance such that when the audio signal is transmitted by one computing device (e.g. via a speaker), it may be received at the other computing device (e.g. via a microphone), and processed by the other computing device to determine the first data without error. For example, a greater distance between the two computing devices may be accommodated where the speaker associated with the first computing device provides greater amplification, and/or where the microphone associated with the second computing device is more sensitive.

By transmitting and receiving the image or audio signal in the manner described above, extensive user involvement need not be required. The user of the first computing device need not manually enter information about the second computing device or a user thereof in order to transmit the image or audio signal. For example, the user of the first computing device need not manually enter routing data associated with the second computing device to establish a communication channel in order to transmit the image or audio signal. Moreover, the user of the second computing device need not manually type the password into his or her computing device in at least one embodiment. In order to transmit the image or audio signal, the first computing device may be simply directed by the user to display the image, for example, or play the audio signal, for example. The first computing device may be configured to generate at least some or all of the first data, and represent it in the form of the image or audio signal, automatically in response to the user direction.

Moreover, by transmitting and receiving an image or audio using an out-of-band communication path, security may be enhanced. By transmitting a password in the form of an image or audio signal, the password, as represented by the image or audio signal, may be utilized by both computing devices to bootstrap to a larger cryptographically strong encryption key.

Referring again to FIG. 6, at 625, the first data is determined from the image or audio signal at the second computing device. As previously described, the image or audio signal is a representation of first data. In other words, the password, and perhaps routing data and/or other identifying information may be recovered from the image or audio signal received, so that it may be further processed at the second computing device.

In some embodiments, the user of the second computing device may be presented with an option (e.g. via a dialog box in a user interface) as to whether to continue with the remaining acts of method 600 (e.g. to perform a key exchange with the first computing device at 630). This option may be provided to the user of the second computing device to confirm that the key exchange (acts 628 to 645) should be performed. For example, where the user of the first computing device may be inviting the user of the second computing device to join a group, and where it would be prudent to warn the user of the second computing device that his or her device may be subject to certain controls if he or she agrees to join the group, it may be desirable to give him or her the option of declining the key exchange. Where an option is presented to the user of the second computing device and the user decides not to continue with the key exchange, remaining acts of method 600 are not performed.

Alternatively, the key exchange may be performed automatically once the user has activated a device (e.g. camera or microphone) to capture the image or audio signal (at 620).

In at least some embodiments, establishment of the communication channel is initiated by the second computing device, which contacts the first computing device at 628. In establishing the communication channel with the first computing device, routing data pre-stored on the second computing device (e.g. in an address book) or routing data recovered from the first data received at 620 may be used, for example.

In at least one embodiment, where the routing data associated with the first computing device may comprise a PIN associated with the first computing device, the communication channel between the first and second computing device may comprise a peer-to-peer channel such as a PIN-to-PIN channel.

A key exchange is performed between the first and second computing devices (630, 640) over a communication channel established between the two computing devices (e.g. the communication channel established by the second computing device after contacting the first computing device as identified by the routing data at 628, or some other communication channel) in accordance with a key exchange protocol. The key exchange may involve exchanges of second data between the first and second computing devices, in accordance with the key exchange protocol (e.g. data required to complete the key exchange, which may include for example, the transfer of computed intermediate values in accordance with the key exchange protocol).

Although act 628 is shown as a separate act in FIG. 6, in at least some embodiments, the initiation of the establishment of the communication channel at 628 may be an act performed as a part of the key exchange performed by the second computing device at 640. The communication channel may be established over, for example, a WAN network (e.g. the Internet), an Intranet, an 802.11 or Bluetooth link, which may be insecure. As noted above, in one embodiment, the communication channel may be a peer-to-peer channel such as a PIN-to-PIN channel.

As a result of the key exchange, an encryption key may be derived at each of the first and second computing devices (635, 645).

Subsequent to the key exchange between the first and second computing devices at 630 and 640, any further communication of data between the first computing device and the second computing device over an otherwise insecure communication channel may be secured using the encryption key derived at each computing device at 635 and 645, or a session key derived from that encryption key derived at each computing device.

The key exchange protocol performed at 630 and 640 may be a cryptographic method for password-authenticated key agreement (e.g. cryptographic keys may be established by one or more parties based on their knowledge of a shared password).

Since the key exchange protocol performed at 630 and 640 is based on a shared password (i.e. password-authenticated key agreement) and the password is independent of the security parameters (e.g. public keys), a key exchange protocol based on public keys or hashes thereof (e.g. Secure Socket Layer/Transport Layer Security (SSL/TLS), Secure Key Exchange Mechanism (SKEME), Internet Key Exchange (IKE), etc.) need not be utilized in at least one embodiment described herein.

In some embodiments, the key exchange protocol performed at 630 and 640 may comprise the SPEKE protocol. The SPEKE protocol is one example of a cryptographic method for password-authenticated key agreement, which on the basis of a shared password, allows parties to derive the same encryption key (i.e. a SPEKE established key) for sending secure and authenticated communications to each other, over what may be an otherwise insecure communication channel. The SPEKE protocol may involve a password-authenticated Diffie-Hellman exchange, where the password forms the base or "generator" of the exchange.

In other embodiments, the key exchange protocol may comprise variants of the SPEKE protocol. In other embodiments, the key exchange protocol, which may be SPEKE or variants thereof, may be combined with other compatible key exchange protocols to provide additional layers of security. Persons skilled in the art will appreciate that by using SPEKE or variants thereof, fewer data exchanges may be required to complete the key exchange when compared to the use of other protocols (e.g. SSL/TLS).

Other examples of key exchange protocols based on a shared password which may be utilized include, for example, encrypted key exchange (EKE), password authenticated key exchange by juggling (J-PAKE) and Password Derived Moduli (PDM) to name a few.

Optionally, at 650, where the first computing device (or a user thereof) wishes to transmit one or more security parameters (e.g. one or more public keys) to a second computing device (or a user thereof), the one or more security parameters may be encrypted with the encryption key derived at 635 or a session key derived from the encryption key derived at 635. Accordingly, at 660a, the one or more encrypted security parameters may be transmitted from the first computing device to the second computing device. At 665a, the one or more encrypted security parameters may be received at the second computing device from the first computing device. Upon receiving the one or more encrypted security parameters from the first computing device, the second computing device may decrypt the one or more encrypted security parameters using the encryption key derived at 645 or a session key derived from the encryption key derived at 645 to retrieve the one or more security parameters of the first computing device.

Optionally, at 655, where the second computing device (or a user thereof) wishes to transmit one or more security parameters (e.g. one or more public keys) to a first computing device (or a user thereof), the one or more security parameters may be encrypted with the encryption key derived at 645 or a session key derived from the encryption key derived at 645. Accordingly, at 665b, the one or more encrypted security parameters may be transmitted from the second computing device to the first computing device. At 660b, the one or more encrypted security parameters may be received at the first computing device from the second computing device. Upon receiving the one or more encrypted security parameters from the second computing device, the first computing device may decrypt the one or more encrypted security parameters using the encryption key derived at 635 or a session key derived from the encryption key derived at 635 to retrieve the one or more security parameters of the second computing device.

Persons skilled in the art will appreciate that in different situations, one or more security parameters may be transmitted from the first computing device to the second computing device (e.g. acts 660a and 665a are performed), from the second computing device (e.g. acts 660b and 665b are performed) to the first computing device, or both ways (e.g. acts 660a, 660b, 665a and 665b are performed).

In some embodiments, the one or more security parameters may comprise one or more public keys associated with a user of either the first computing device or the second computing device. As described previously with reference to FIG. 4, data signed using a private key of a private key/public key pair can only be verified using the corresponding public key of the pair, and data encrypted using a public key of a private key/public key pair can only be decrypted using the corresponding private key of the pair.

For example, once the user of a first computing device has the public key of the user of a second computing device, the user of the first computing device may then send encrypted messages to the user of the second computing device. As a further example, once the user of a first computing device is reasonably certain that his public key has been received by the second computing device, the user of the first computing device may then digitally sign messages to be sent to the user of the second computing device.

Similarly, once the user of a second computing device has the public key of the user of a first computing device, the user of the second computing device may then send encrypted messages to the user of the first computing device. As a further example, once the user of a second computing device is reasonably certain that his public key has been received by the first computing device, the user of the second computing device may then digitally sign messages to be sent to the user of the first computing device.

Multiple public keys (and corresponding private keys) may be transmitted from the first computing device to the second computing device, from the second computing device to the first computing device, or both. For example, two public keys may be associated with the same user of a given computing device. A first public key may be usable to encrypt messages to a user of the given computing device, and a second public key may be usable to verify digital signatures of messages digitally signed at the given computing device. Different public keys may be employed for different purposes, and the one or more security parameters being transmitted from one computing device to another may comprise a plurality of said different public keys.

Figure 7:
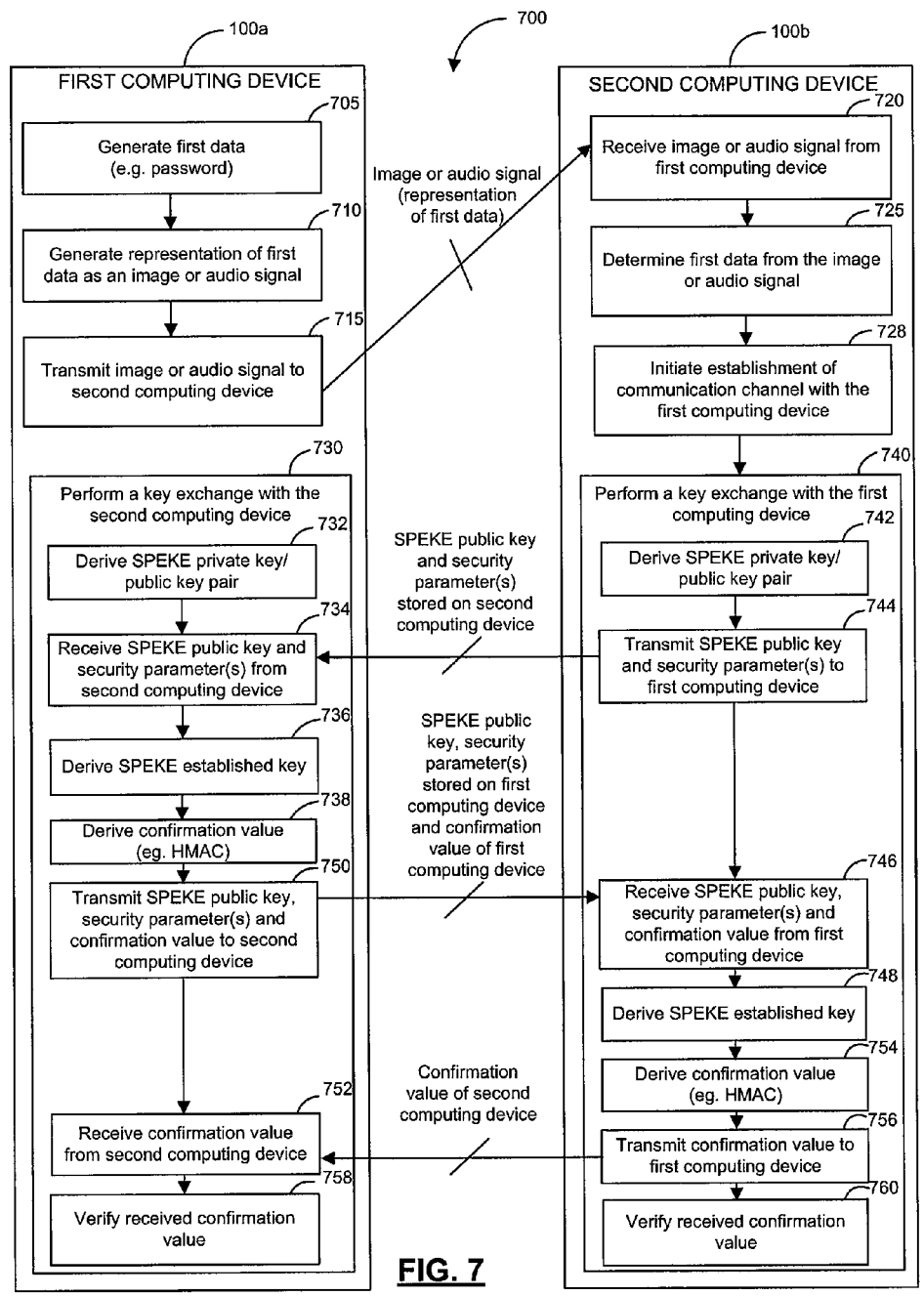
FIG. 7 is a flowchart illustrating acts of a method of securely transmitting a security parameter from one computing device to another computing device in accordance with at least one other embodiment.

FIG. 7 is a flowchart illustrating at least one variant embodiment that is similar to method 600 shown in FIG. 6. Generally, embodiments of the method illustrated by the flowchart in FIG. 7 are similar to embodiments of the method illustrated by the flowchart in FIG. 6, except that some acts of the key exchange protocol and the transmittal of security parameters are intertwined, as described in further detail below. By intertwining acts of the key exchange protocol and the transmittal of security parameters, this may provide an advantage of not requiring as many communication passes in order to effect the exchange of security parameters between the first and second computing devices.

In one variant embodiment, the security parameters are transmitted in unencrypted form. The present inventors recognized that where the one or more security parameters to be transmitted comprises one or more public keys, there would be no need to keep the data secret (and therefore encrypt it) because it is already "public" information (i.e. anyone may have access to it). However, when one or more security parameters are received at a given computing device, it is still typically desirable to ensure that the received security parameters are authentic. In this variant embodiment, although a key is derived at each computing device in accordance with a key exchange protocol (e.g. the SPEKE protocol), this key is not used as an encryption key per se (as in method 600 of FIG. 6), but is instead used as a key for deriving a value that may be verified in order to authenticate the security parameters being exchanged.

Acts 705, 710, and 715 are analogous to acts 605, 610 and 615 of FIG. 6, respectively, and the reader is directed to the description of FIG. 6 above for further details in respect of acts 705, 710, and 715. Similarly, acts 720, 725, and 728 are analogous to acts 620, 625, and 628 of FIG. 6, respectively, and the reader is directed to the description of FIG. 6 above for further details in respect of acts 720, 725, and 728.

A key exchange is performed between the first and second computing devices (730, 740) over a communication channel established between the two computing devices (e.g. the communication channel established by the second computing device after contacting the first computing device as identified by the routing data at 728, or some other communication channel) in accordance with a key exchange protocol. The key exchange may involve exchanges of second data between the first and second computing devices, in accordance with the key exchange protocol (e.g. data required to complete the key exchange, which may include for example, the transfer of computed intermediate values in accordance with the key exchange protocol). For ease of exposition, the acts of the key exchange will be described in FIG. 7 with reference to the SPEKE protocol, although it will be understood by persons skilled in the art that other key exchange protocols might be employed in variant embodiments.

Although act 728 is shown as a separate act in FIG. 7, in at least some embodiments, the initiation of the establishment of the communication channel at 728 may be an act performed as a part of the key exchange performed by the second computing device at 740. The communication channel may be established over, for example, a WAN network (e.g. the Internet), an Intranet, an 802.11 or Bluetooth link. As previously described, in one embodiment, the communication channel may be a peer-to-peer channel such as a PIN-to-PIN channel.

At 732, one or more intermediate keys may be derived at the first computing device using the password as part of the key exchange protocol. Similarly, at 742, one or more intermediate keys may be derived at the second computing device using the password as part of the key exchange protocol. The one or more intermediate keys derived using the password may be, for example, a SPEKE private key/public key pair where the key exchange protocol performed at 730 and 740 is the SPEKE protocol.

At 744, an intermediate key derived at the second computing device (e.g. a SPEKE public key) is transmitted from the second computing device to the first computing device, where it is received at 734. Where the second computing device (or a user thereof) wishes to transmit one or more security parameters (e.g. one or more public keys associated with a user of the second computing device and intended for subsequent use in encoding messages) to a first computing device (or a user thereof), the one or more security parameters may also be transmitted from the second computing device to the first computing device, at 744, where it is received, at 734.

At 736, a further key may be derived at the first computing device in accordance with the key exchange protocol. This further key may be, for example, a SPEKE established key, where the key exchange protocol performed at 730 and 740 is the SPEKE protocol. As is known, the SPEKE established key derived at the first computing device is a function of the SPEKE public key derived at the second computing device, which is received from the second computing device at 734, and the SPEKE private key derived at the first computing device at 732.

At 738, a confirmation value is derived at the first computing device using the key derived at 736 (e.g. SPEKE established key). The confirmation value may be a Keyed-Hash Message Authentication Code (HMAC), for example, which uses the key derived at 736 and a hash computed using at least some of the data exchanged (or to be exchanged) with the second computing device.

For example, at 738, an HMAC may be computed at the first computing device using the key derived at 736, and a hash computed based on the following data:
- at least some of the first data transmitted to the second computing device at 715 (e.g. a group name, group type, invitation ID, a PIN associated with the first computing device), although the password need not be included in the hashed data;
- one or more security parameters (e.g. one or more public keys for message encoding) received from the second computing device at 734; and
- one or more security parameters (e.g. one or more public keys for message encoding) to be transmitted from the first computing device to the second computing device at 750.

Those skilled in the art will appreciate that the data included in the hash may not include all of the information identified above, and may include additional data not identified above. Generally, the confirmation value derived at the first computing device may be derived as an HMAC computed by hashing all of the data exchanged in the protocol, in combination with the SPEKE established key derived at the first computing device.

At 750, an intermediate key derived at the first computing device at 732 (e.g. a SPEKE public key) is transmitted from the first computing device to the second computing device, where it is received at 746. Where the first computing device (or a user thereof) wishes to transmit one or more security parameters (e.g. one or more public keys associated with a user of the first computing device and intended for subsequent use in encoding messages) to a second computing device (or a user thereof), the one or more security parameters may also be transmitted from the first computing device to the second computing device, at 750, where it is received, at 746. Additionally, at 750, the confirmation value may also be transmitted from the first computing device to the second computing device, where it is received at 746.

At 748, a further key may be derived at the second computing device in accordance with the key exchange protocol. This further key may be, for example, a SPEKE established key, where the key exchange protocol performed at 730 and 740 is the SPEKE protocol. In accordance with SPEKE, the SPEKE established key derived at the first computing device at 736, and the SPEKE established key derived at the second computing device at 748, are expected to match.

At 754, a confirmation value is derived at the second computing device using the key derived at 748 (e.g. SPEKE established key). Similar to act 738 performed at the first computing device, the confirmation value may be an HMAC, for example, computed using the key derived at 748 and a hash computed using at least some of the data exchanged (or to be exchanged) with the first computing device.

For example, at 754, an HMAC may be computed at the second computing device using the key derived at 748, and a hash computed based on the following data:
- at least some of the first data received from the first computing device at 720 (e.g. a group name, group type, invitation ID, a PIN associated with the first computing device), although the password need not be included in the hashed data;
- one or more security parameters (e.g. one or more public keys for message encoding) transmitted to the first computing device at 744; and
- one or more security parameters (e.g. one or more public keys for message encoding) received from the first computing device at 746.

Those skilled in the art will appreciate that the data included in the hash may not include all of the information identified above, and may include additional data not identified above. Generally, the confirmation value derived at the second computing device may be derived as an HMAC computed by hashing all of the data exchanged in the protocol, in combination with the SPEKE established key derived at the second computing device.

At 756, the confirmation value derived at 754 may be transmitted from the second computing device to the first computing device, where it is received at 752.

At 758 and 760, the confirmation value received at each of the first and second computing devices is verified at the respective computing device. If the confirmation value received is successfully verified at a given computing device (i.e. it is confirmed that the value is what it is expected to be, given that both computing devices know how the various confirmation values are computed), then the security parameters (e.g. one or more public keys used for message encoding) received at that given computing device from the other computing device may be considered to be authentic. If the confirmation value does not successfully verify (e.g. an HMAC will not be calculated accurately if the exchanged data has been tampered with in transit), then the security parameters will fail to be authenticated.

In at least some embodiments, the confirmation value derived at the first computing device and the confirmation value derived at the second computing device are computed so that they are different. This is done intentionally by introducing known values in the computation of the confirmation values (e.g. HMACs), and may provide added security by preventing replay attacks where the second computing device (i.e. the joiner) might simply re-transmit a confirmation value computed at and received from the first computing device (i.e. the inviter). For example, the hash used to derive the confirmation value at the first computing device, at 738, may additionally be based on data that comprises a specific known value (e.g. the byte 0x03). Similarly, the hash used to derive the confirmation value at the second computing device, at 754, may additionally be based on data that comprises a specific, but different known value (e.g. the byte 0x02). Accordingly, the confirmation value derived at the first computing device may be an HMAC computed based on all exchanged data plus a specific known value associated with the first computing device, using the SPEKE established key derived at the first computing device. Similarly, the confirmation value derived at the second computing device may be an HMAC computed based on all exchanged data plus a different, specific known value associated with the second computing device, and using the SPEKE established key derived at the second computing device. Although the confirmation values derived at each of the computing devices will be different, since the hash is additionally based on known values, the confirmation values can still be verified at both computing devices.

Although the method 700 illustrated in FIG. 7 is described above with reference to the SPEKE protocol as the key exchange protocol, persons skilled in the art will appreciate that variants of SPEKE and other key exchange protocols based on a shared password may also be utilized.

Persons skilled in the art will understand that method 700 may be modified to accommodate situations where only one of the first and second computing devices transmits one or more security parameters to the other of the first and second computing devices, in variant embodiments.

As previously noted, persons skilled in the art will also appreciate that more than one security parameter may be transmitted in accordance with the embodiments described herein. Furthermore, the one or more security parameters are not limited to public keys, and may comprise, for example, other data which could then be used to provide authenticity and confidentiality for further communication between the two computing devices. In some embodiments, multiple public keys may be transmitted in accordance with the embodiments described herein, with a different public key for a specific purpose. For example, the one or more public keys may comprise a first public key usable to encrypt messages to a user of the first computing device, and a second public key usable to verify digital signatures of messages digitally signed at the first computing device.

The embodiments described herein do not require a public key infrastructure in order to allow users of computing devices to transmit public keys to, and receive public keys from, each other.

The embodiments described herein also do not require manual verification of a public key (e.g. a user checking and confirming the public key fingerprint), which may require extensive user involvement.

Also, when the computing devices in the embodiments described above are mobile devices, since mobile devices are generally portable handheld devices which can easily be brought physically close to one another, there may be more instances when users of mobile devices may want to exchange public keys or other security parameters on the spur of the moment (e.g. if two users, previously unknown to each other, meet at a party or some other setting), in accordance with one or more embodiments described herein.

Although the embodiments described herein relate to the transmission and reception of an image or audio signal that is a representation of first data, in variant embodiments, first data may be transmitted in an electronic mail (i.e. e-mail) message. In these embodiments, the first data may be transmitted as an e-mail message with the password contained in the message itself. In variant embodiments, the first data may be transmitted as an e-mail message with a hint to a password. Where a hint for the password is contained in the message, the users of the two computing devices who wish to exchange security parameters should know a priori what the password may be, with the hint of the password providing a suggestion to the user of the second computing device as to what the password is. The user of the second computing device may then manually enter the password in a user interface of an application or confirm that the password is to be used in order to initiate the security parameter transmittal process on his or her computing device. In variant embodiments, the first data may be transmitted in a peer-to-peer message, such as a PIN message, in a similar manner.

In variant embodiments, the first data transmitted from the first device to the second computing device (e.g. 615 of FIG. 6, 715 of FIG. 7), may be transmitted in the form of a medium other than an image or audio signal. For example, the first data may be transmitted in the form of an infrared signal, to be received at the receiving computing device using appropriate hardware.

The acts of method 600 of transmitting security parameters in accordance with an embodiment described herein may be provided as executable software instructions stored on computer-readable storage media.

The acts of method 600 of transmitting security parameters in accordance with an embodiment described herein may be provided as executable software instructions stored on transmission-type media.

Figure 8:
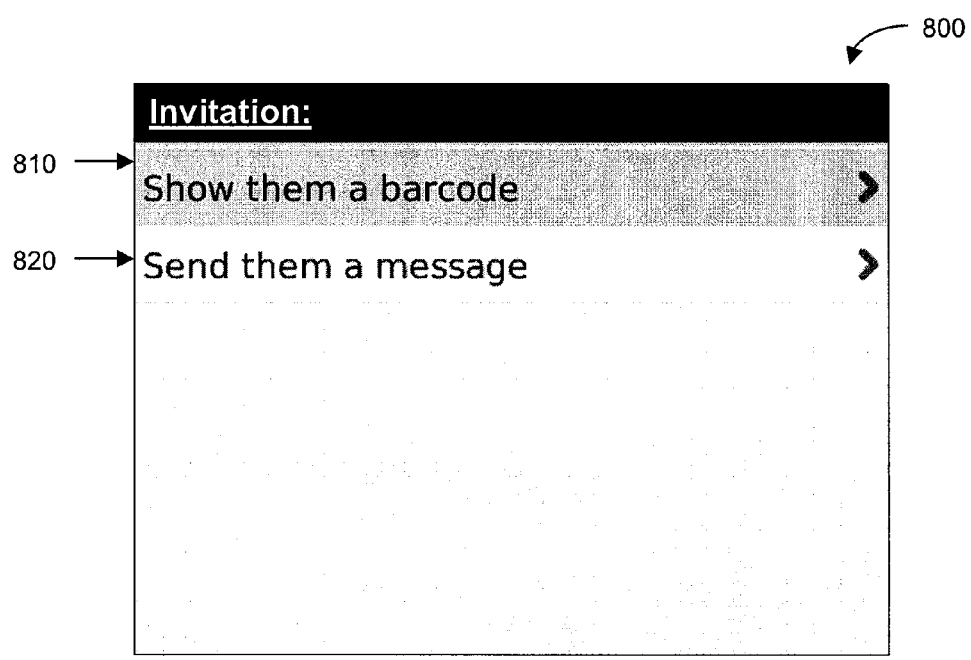
FIG. 8 is an example screen capture of the display of a computing device prompting a user with an option to generate either an image (e.g. a barcode) or an e-mail message in accordance with at least one embodiment.
Figure 9:
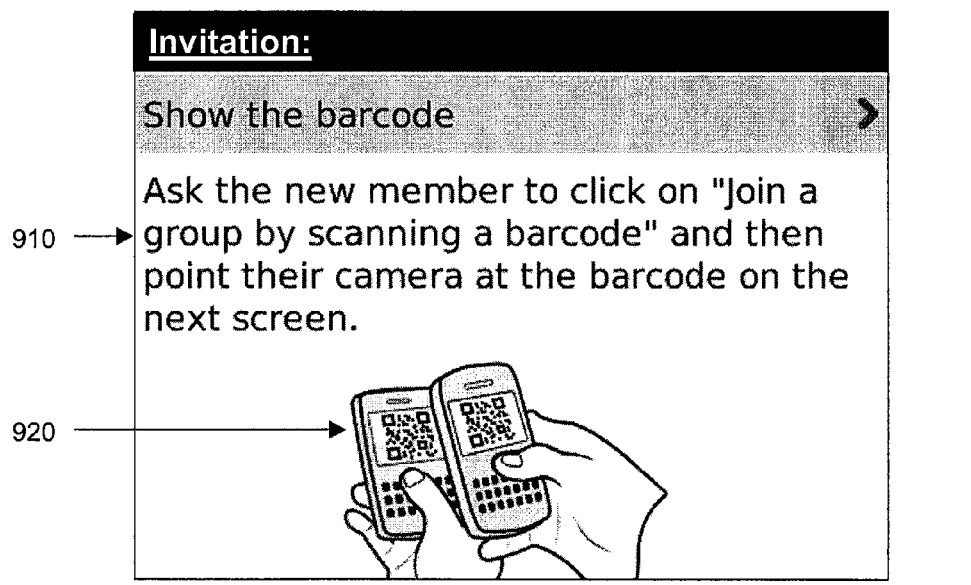
FIG. 9 is an example screen capture of the display of a computing device wherein a user has selected an option to generate an image (e.g. a barcode) in accordance with an example embodiment.
Figure 10:
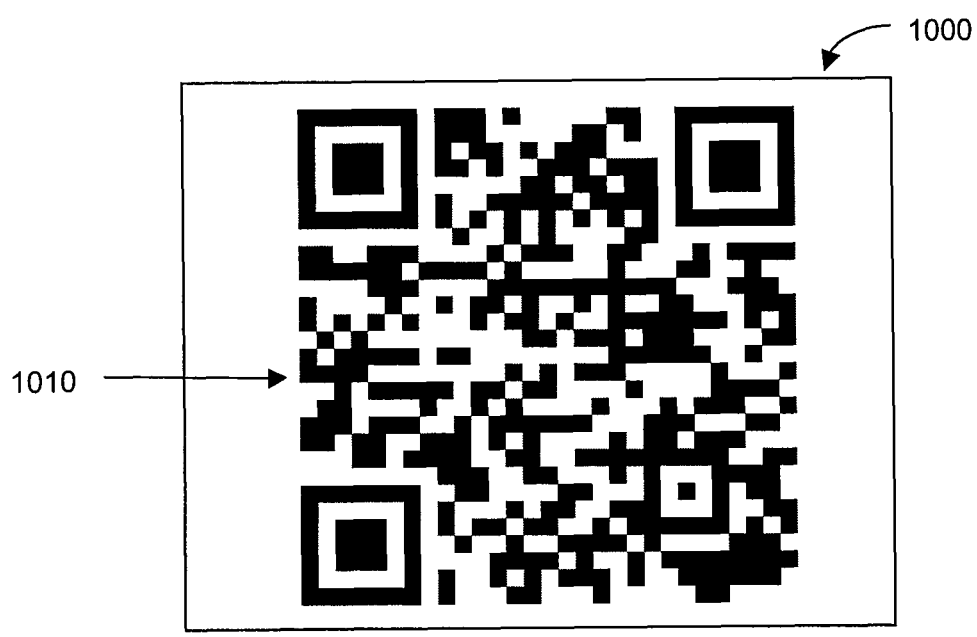
FIG. 10 is an example screen capture of the display of a computing device as it displays an image (e.g. a barcode) for transmission to another computing device in accordance with an example embodiment.

By way of illustration, FIGS. 8 to 10 are example screen captures of a display (e.g. display 110 of FIG. 1) of the first computing device (e.g. mobile device 100 of FIG. 1) as a method of transmitting security parameters (e.g. method 600 of FIG. 6 or method 700 of FIG. 7) is performed in accordance with an example embodiment.

FIG. 8 is an example screen capture 800 of the display of the first computing device prompting a user with an option to generate either an image (e.g. a barcode) or an e-mail message (e.g. act 610 of FIG. 6 or act 710 of FIG. 7). For example, in the user interface 800, the user may select a first option 810, "Show them a barcode", to generate an image (e.g. a barcode), or a second option 820, "Send them a message".

FIG. 9 is an example screen capture 900 of the display of the first computing device wherein a user has selected an option to generate an image (e.g. a barcode). For example, a user of the first computing device may provide instructional text 910 and/or instructional diagrams 920 to instruct a user to transmit the image (e.g. a barcode) from the first computing device to the second computing device.

FIG. 10 is an example screen capture 1000 of the display of the first computing device as it displays an image (e.g. a barcode) 1010 for transmission to the second computing device (see e.g. act 615 of FIG. 6 or act 715 of FIG. 7).

Figure 11:
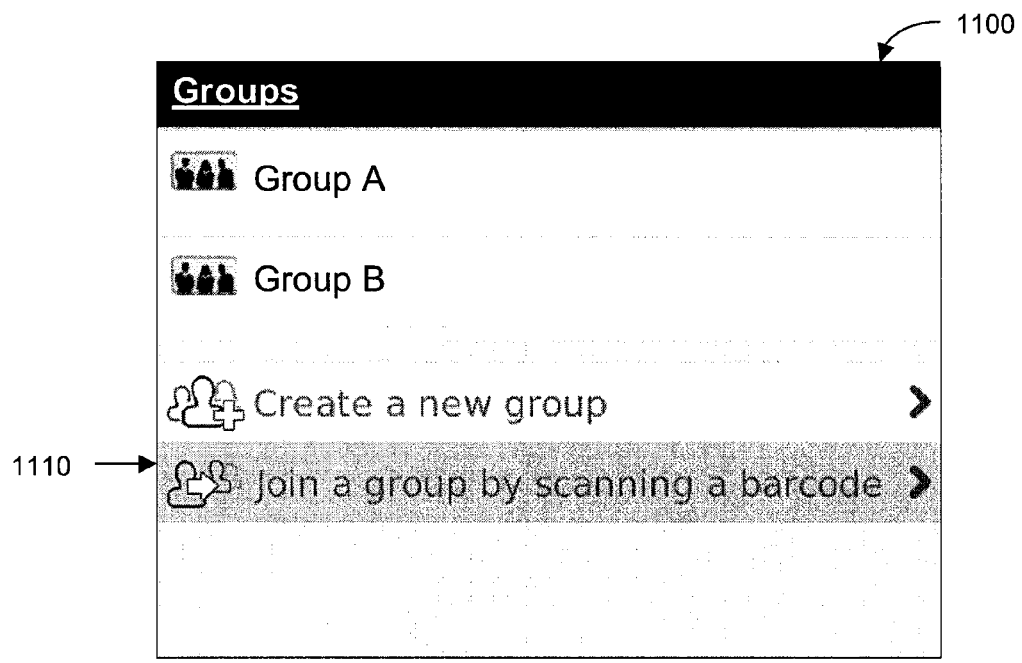
FIG. 11 is an example screen capture of the display of a computing device prompting a user with an option to receive the transmission of an image (e.g. a barcode) from another computing device in accordance with an example embodiment.
Figure 12:
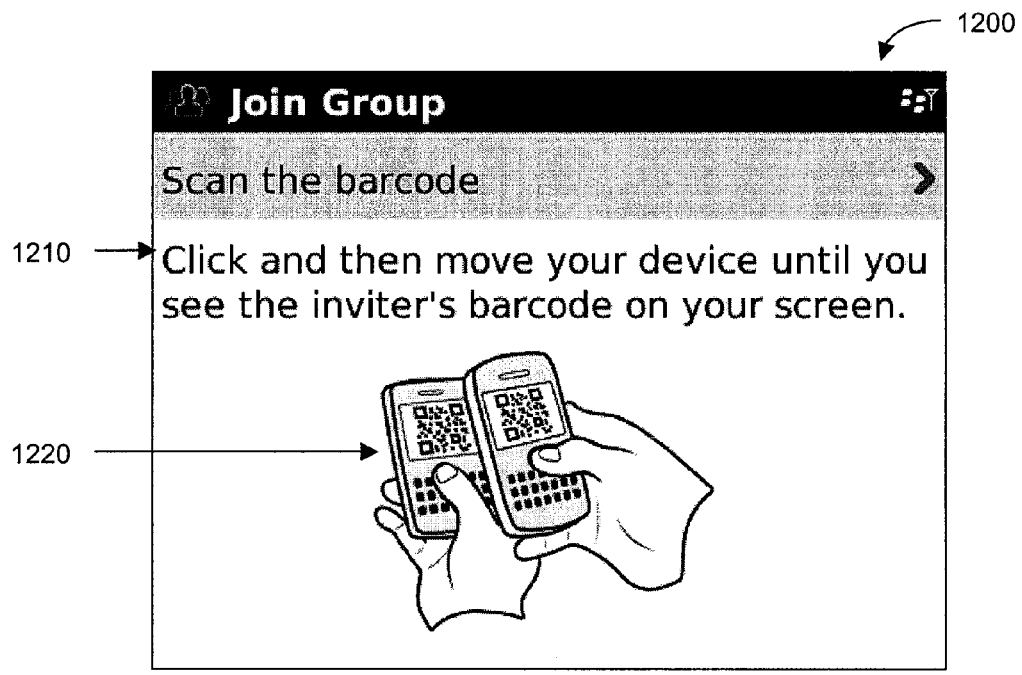
FIG. 12 is an example screen capture of the display of a computing device as it instructs a user on how to receive an image (e.g. a barcode) from another computing device in accordance with an example embodiment.
Figure 13:
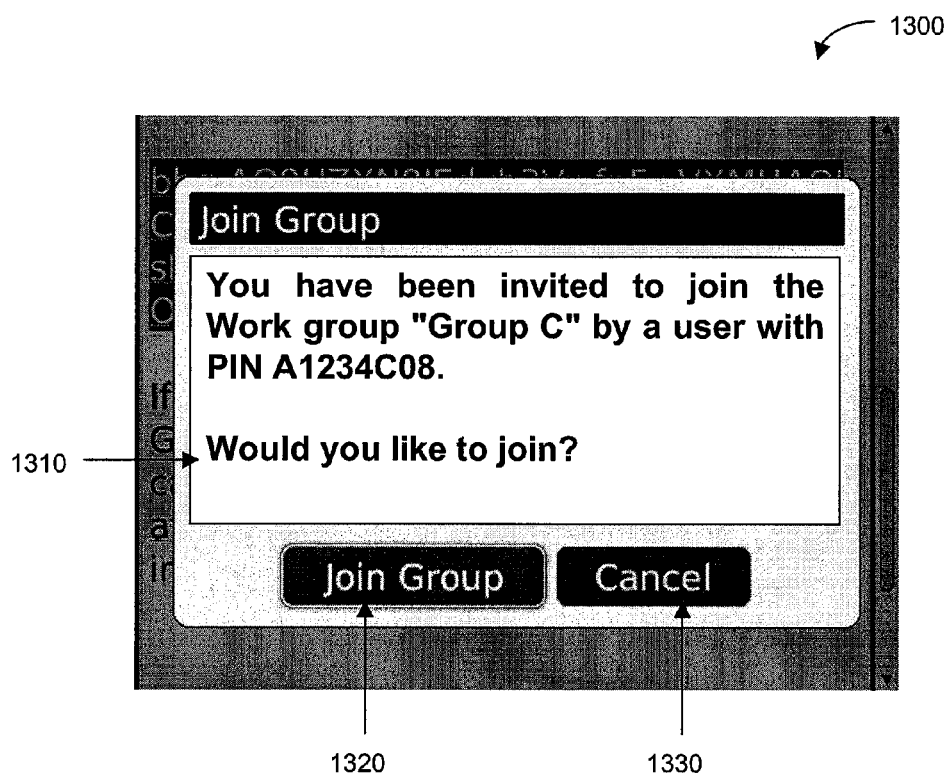
FIG. 13 is an example screen capture of the display of a computing device upon receiving an image (e.g. a barcode) transmitted from another computing device and upon determining first data from the image (e.g. a barcode) in accordance with an example embodiment.

By way of further illustration, FIGS. 11 to 13 are example screen captures of a display (e.g. display 110 of FIG. 1) of the second computing device (e.g. mobile device 100 of FIG. 1) as a method of transmitting security parameters (e.g. method 600 of FIG. 6 or method 700 of FIG. 7) is performed in accordance with an example embodiment.

FIG. 11 is an example screen capture 1100 of the display of the second computing device prompting a user with an option to receive the transmission of an image (e.g. a barcode) from the first computing device (see e.g. act 620 of FIG. 6 or act 720 of FIG. 7). For example, in a user interface of the second computing device, the user may select an option 1110, "Join a group by scanning a barcode", to begin receiving the image (e.g. a barcode).

FIG. 12 is an example screen capture 1200 of the display of the second computing device as it instructs a user on how to receive an image (e.g. a barcode) from the first computing device. For example, a user interface of the second computing device may provide instructional text 1210 and/or instructional diagrams 1220 to instruct a user on how to receive the image from the first computing device at the second computing device.

FIG. 13 is an example screen capture 1300 of the display of the second computing device upon receiving an image (e.g. a barcode) transmitted from the first computing device, and upon determining first data from the image, such as a barcode for example (see e.g. act 625 of FIG. 6 or act 725 of FIG. 7). For example, a user interface of the second computing device may provide a prompt 1310 to a user to confirm whether to continue with the key exchange. The prompt may show the routing data associated with the first computing device (e.g. a PIN associated with the first computing device). The prompt may also show other identifying information of the first computing device or a user thereof (e.g. that the user of the first computing device is a member of the Work group "Group C"). Where the user wishes to continue, the user may indicate his/her acceptance by selecting a confirmation option 1320, "Join Group", for example. This may allow the user to communicate with other members who have joined the group securely, using the security parameter(s) to be exchanged. Where the user does not wish to continue with the remaining acts of method 600 or method 700, the user may abort by selecting a cancellation option 1330, "Cancel", for example.

Figure 14:
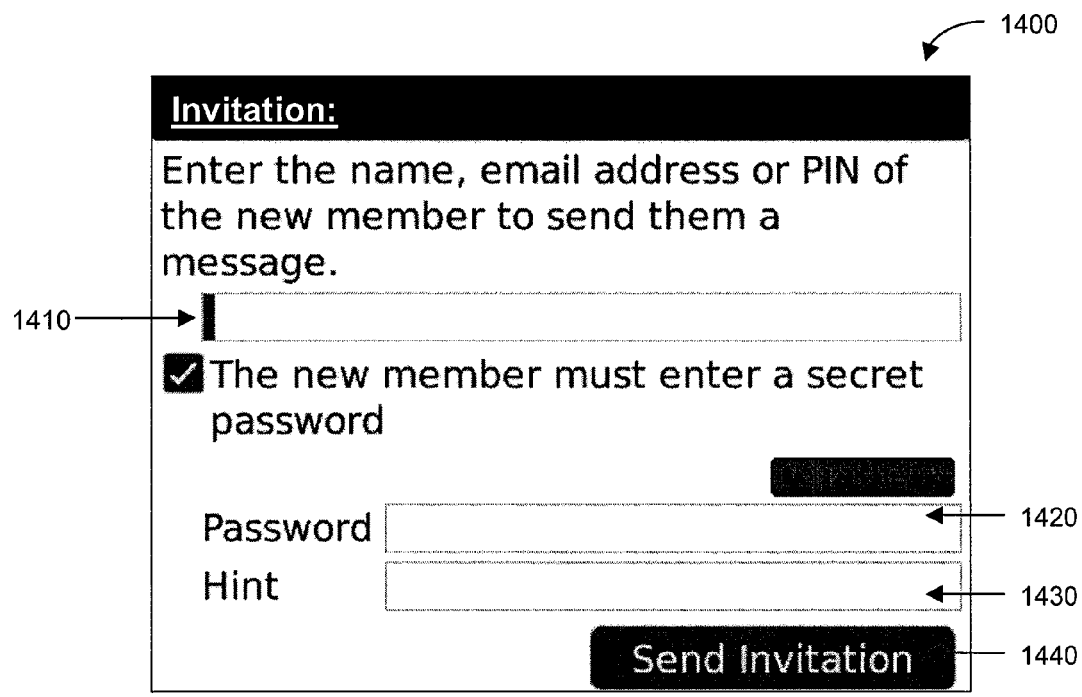
FIG. 14 is an example screen capture of the display of a computing device wherein a user has selected an option to generate an e-mail message in accordance with an example embodiment.

By way of further illustration, FIG. 14 is an example screen capture 1400 of a display of the first computing device wherein a user has selected an option to generate a message, instead of an image or audio signal, in accordance with a variant embodiment previously described herein. For example, in a user interface of the first computing device, the user of the first computing device may be prompted to enter in a text field 1410 either the name, email address or PIN, for example, of the second computing device or a user thereof. The user of the first computing device may be prompted to enter in a text field 1420 the password itself and/or a hint for the password in a text field 1430. An e-mail message or PIN message or other types of message addressed to a user of the second computing device may then be sent (e.g. in response the user of the first computing device selecting a send option 1440, "Send invitation").

It will be understood that while examples have been presented herein illustrating embodiments of a method where two computing devices are involved, more than two computing devices may be involved in variant implementations. For example, a user may invite multiple people to join a private group, so that everyone in the private group can communicate with each other. To facilitate this, the same barcode may be shown to multiple invitees, or a different barcode may be shown to each invitee.

As used herein, the wording "and/or" is intended to represent an inclusive- or. That is, "X and/or Y" is intended to mean X or Y or both. Moreover, "X, Y, and/or Z" is intended to mean X or Y or Z or any combination thereof.

A number of embodiments have been described herein. However, it will be understood by persons skilled in the art that other variants and modifications may be made without departing from the scope of the claimed embodiments appended hereto.

The invention claimed is:

1. A method of transmitting one or more security parameters to a first computing device from a second computing device, the method performed at the second computing device, the method comprising:
    receiving an audio signal, wherein the audio signal is a representation of first data, the first data comprising a password, wherein the password is not derived from a security parameter stored on the first computing device;
    determining the password from the audio signal; and
    performing a key exchange with the first computing device over a communication channel between the first and second computing devices, wherein second data is exchanged between the first and second computing devices in accordance with a key exchange protocol, such that a key, other than the one or more security parameters, is derived at each of the first and second computing devices using the password, and wherein the one or more security parameters is transmitted to the first computing device during the key exchange;
    wherein said performing further comprises
        computing a confirmation value based on at least the one or more security parameters, and using the key derived at the second computing device, and
        transmitting the confirmation value to the first computing device, wherein the one or more security parameters are authenticated when the confirmation value is successfully verified at the first computing device; and
    wherein the one or more security parameters comprise one or more public keys stored on the second computing device.

2. The method of claim 1, wherein said receiving the audio signal is performed when the first and second computing devices are in close physical proximity.

3. The method of claim 1, wherein the confirmation value comprises a keyed-hash message authentication code.

4. The method of claim 1, wherein the key exchange protocol comprises a SPEKE protocol.

5. The method of claim 1, wherein the audio signal comprises a plurality of audio tones.

6. The method of claim 1, wherein at the receiving, the audio signal is received via a microphone of the second computing device, wherein the microphone is configured to receive the audio signal after being output on a speaker of the first computing device.

7. The method of claim 1, wherein at the receiving, the audio signal is received via a channel established during a phone call between the first computing device and the second computing device.

8. The method of claim 1, wherein the first data further comprises routing data associated with the first computing device.

9. The method of claim 8, further comprising establishing the communication channel by initiating contact with the first computing device using the routing data.

10. The method of claim 8, wherein the routing data comprises a PIN associated with the first computing device, and wherein the communication channel between the first and second computing devices comprises a PIN-to-PIN channel.

11. The method of claim 1, wherein the password comprises a random number or string.

12. The method of claim 1, further comprising receiving one or more second security parameters from the first computing device, receiving a second confirmation value from the first computing device, and verifying the second confirmation value.

13. The method of claim 1, wherein at least one computing device selected from the following group comprises a mobile device: the first computing device, and the second computing device.

14. A second computing device comprising a processor and a memory, the processor configured to execute one or more application modules, said one or more application modules comprising:
a module configured to receive an audio signal, wherein the audio signal is a representation of first data, the first data comprising a password, wherein the password is not derived from a security parameter stored on a first computing device;
a module configured to determine the password from the audio signal; and
a module configured to perform a key exchange with the first computing device over a communication channel between the first and second computing devices, wherein second data is exchanged between the first and second computing devices in accordance with a key exchange protocol, such that a key, other than the one or more security parameters, is derived at each of the first and second computing devices using the password, and wherein the one or more security parameters is transmitted to the first computing device during the key exchange;
wherein said module configured to perform the key exchange is further configured to
compute a confirmation value based on at least the one or more security parameters and the key derived at the second computing device, and to
transmit the confirmation value to the first computing device, wherein the one or more security parameters are authenticated when the confirmation value is successfully verified at the first computing device; and
wherein the one or more security parameters comprise one or more public keys stored on the second computing device.

15. The second computing device of claim 14, wherein at least one computing device selected from the following group comprises a mobile device:
the first computing device, and the second computing device.

16. The second computing device of claim 14, wherein the confirmation value comprises a keyed-hash message authentication code.

17. The second computing device of claim 14, wherein the key exchange protocol comprises a SPEKE protocol.

18. A non-transitory computer readable storage medium comprising instructions that, when executed by a processor of a second computing device, cause the second computing device to perform acts of a method of transmitting one or more security parameters to a first computing device, the method performed at the second computing device, the acts comprising:
receiving an audio signal, wherein the audio signal is a representation of first data, the first data comprising a password, wherein the password is not derived from a security parameter stored on the first computing device;
determining the password from the audio signal; and
performing a key exchange with the first computing device over a communication channel between the first and second computing devices, wherein second data is exchanged between the first and second computing devices in accordance with a key exchange protocol, such that a key, other than the one or more security parameters, is derived at each of the first and second computing devices using the password, and wherein the one or more security parameters is transmitted to the first computing device during the key exchange;
wherein said performing further comprises
computing a confirmation value based on at least the one or more security parameters and the key derived at the second computing device, and
transmitting the confirmation value to the first computing device, wherein the one or more security parameters are authenticated when the confirmation value is successfully verified at the first computing device; and
wherein the one or more security parameters comprise one or more public keys stored on the second computing device.

19. The medium of claim 18, wherein the confirmation value comprises a keyed-hash message authentication code.

20. The medium of claim 18, wherein the key exchange protocol comprises a SPEKE protocol.

* * * * *